US010502363B2

(12) United States Patent
Edwards et al.

(10) Patent No.: US 10,502,363 B2
(45) Date of Patent: Dec. 10, 2019

(54) SELF-CONTAINED MIXED REALITY HEAD MOUNTED DISPLAY

(71) Applicant: Occipital, Inc., Boulder, CO (US)

(72) Inventors: Jonathan Dana Edwards, San Francisco, CA (US); Tien-Han Huang, San Francisco, CA (US); Jeffrey Roger Powers, San Francisco, CA (US)

(73) Assignee: Occipital, Inc., Boulder, CO (US)

( * ) Notice: Subject to any disclaimer, the term of this patent is extended or adjusted under 35 U.S.C. 154(b) by 110 days.

(21) Appl. No.: 15/375,007

(22) Filed: Dec. 9, 2016

(65) Prior Publication Data

US 2017/0337737 A1 Nov. 23, 2017

Related U.S. Application Data

(60) Provisional application No. 62/337,516, filed on May 17, 2016, provisional application No. 62/337,515, filed on May 17, 2016, provisional application No. 62/337,509, filed on May 17, 2016.

(51) Int. Cl.
*F16M 13/04* (2006.01)
*G02B 27/01* (2006.01)

(52) U.S. Cl.
CPC ............ *F16M 13/04* (2013.01); *G02B 27/017* (2013.01); *G02B 27/0176* (2013.01); *G02B 2027/0136* (2013.01); *G02B 2027/0138* (2013.01)

(58) Field of Classification Search
CPC .......... G02B 27/017; G02B 2027/0187; G02B 2027/0198; G02B 27/0176; G02B 2027/011; G02B 2027/0138; G02B 2027/014; G02B 2027/0178; G02B 27/0093
See application file for complete search history.

(56) References Cited

U.S. PATENT DOCUMENTS

| | | | |
|---|---|---|---|
| 6,369,952 B1* | 4/2002 | Rallison | G02B 27/017 359/630 |
| 2014/0303507 A1* | 10/2014 | Neumiller | A61N 1/39 600/481 |
| 2015/0077517 A1* | 3/2015 | Powers | H04N 5/2253 348/46 |
| 2015/0348327 A1* | 12/2015 | Zalewski | G06F 3/01 345/419 |
| 2016/0063767 A1* | 3/2016 | Lee | G06T 19/006 345/419 |

OTHER PUBLICATIONS

Structure Sensor Quick Start Guide, Occipital, year 2014 Bluetooth LED makes iPHone camera even fhashier, Tinari, Mar. 9, 2016.*
(Continued)

*Primary Examiner* — Devona E Faulk
*Assistant Examiner* — Ming Wu
(74) *Attorney, Agent, or Firm* — Lee & Hayes, P.C.

(57) ABSTRACT

A head mounted display is provided that includes a main body, a sensor, and a door. The door of the head mounted display includes a computing device or, in some cases, an embedded screen. The computing device includes a camera and a display interface. The sensor and the camera of the mobile computing device are rigidly positioned with fixed displacements.

23 Claims, 20 Drawing Sheets

(56) References Cited

OTHER PUBLICATIONS

Photography Accessories for your Ipad, Vorenkamp, Jun. 27, 2015
Review of iblazr External LED Flash for iOS and Android Devices, Brozio, Dec. 5, 2014.*
David On Things Musings on Fusing Virtual and Physical Worlds , Dav,d, Jun. 27, 2015.*
View-Master VR Review: A great first taste of VR for Kids, Simon Crisp, Feb. 25, 2016.*
First look: Sulon Q, the first tether-less VR headset, Mar. 15, 2016, Michelle Fitzsimmons (Year: 2016).*
Engineer Turns 3D Scanner Into Entire Ecosystem, Complete With Medical VR App, Sep. 25, 2015, Michael Molitch-Hou (Year: 2015).*
David On Things Musings on Fusing Virtual and Physical Worlds , https://davidonthings.wordpress.com/, Jun. 27, 2015 (Year: 2015).*
Photography Accessories for your Ipad, Jun. 27, 2015 (Year: 2015).*
First look: Sulon Q, the first tether-less VR headset, Mar. 15, 2016, Michelle Fitzsimmons), (Year: 2015).*
Simon Crisp, View-Master VR Review: A great first taste of VR for Kids,Feb. 25, 2016 (Year: 2016).*
Bluetooth LED makes iPhone camera even fhashier, Mar. 9, 2016) (Year: 2016).*

* cited by examiner

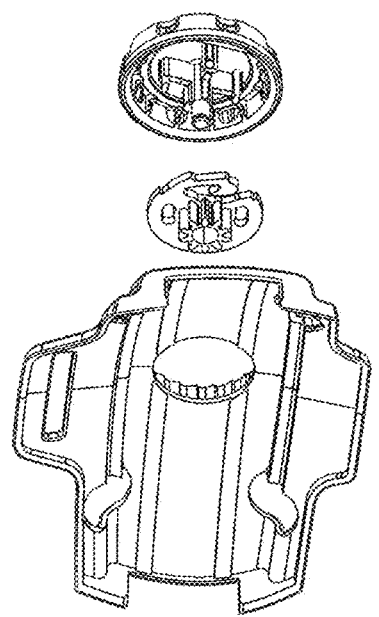
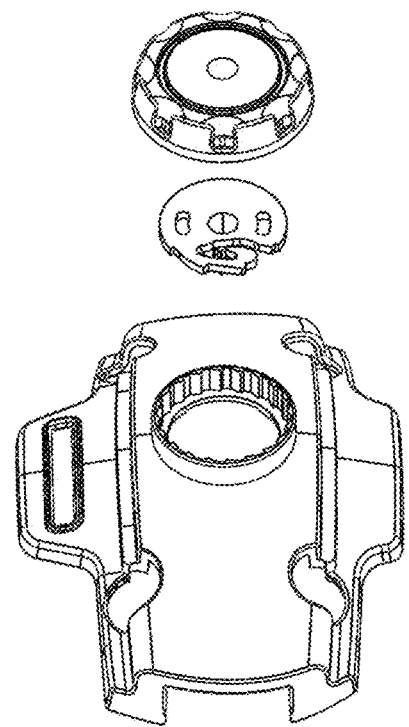
FIGURE 2A-B

SELF-CONTAINED MIXED REALITY HEAD MOUNTED DISPLAY

CROSS-REFERENCE TO RELATED APPLICATIONS

This application claims the benefit of U.S. Provisional Application Nos. 62/337,516, filed 17 May 2016, 62/337,515, filed 17 May 2016, 62/337,509, filed 17 May 2016, which are incorporated in its entirety by this reference.

TECHNICAL FIELD

This invention relates generally to the head mounted display field, and more specifically to new and useful apparatus for a head mounted display with mixed reality capabilities and one or more methods for producing the same.

BACKGROUND

Head Mounted Display (HMD) technology is quickly evolving, especially with respect to its virtual reality (VR) applications for end users. However, many of the existing HMD systems continue to be tethered to computer systems which power the headset and drive the VR experience. In addition, VR HMD's are branching out into the Augmented Reality (AR) environment but still attached to an engine of some sort to drive the experience. End users seeking to feel completely immersive in the AR and/or VR experience yet able to move around your environment beyond just 360 immersive is still a solution waiting to be solved. While some systems can transmit 360-degree immersive video feeds, the recipient of such feeds are "stuck in place" and are not able to move themselves around the environment and not able to reach out and touch things (even virtually).

Accordingly, the embodiments of the present application aim to provide a head mounted display and associated system that provide an immersive presence of virtual reality, but to also allow the user to participate in their real environment beyond the 360 immersive. By merging VR with AR, the embodiments of the present application create a mixed reality experience for the user, completely self-contained with no need to be tethered to a computer system by cables. Thus, there is a need in the HMD field to create new and useful apparatus, systems, and methods for enhancing the HMD per se and the end user experience of the HMD. The embodiments of the present application provide such new and useful apparatus, systems, and methods.

BRIEF DESCRIPTION OF THE FIGURES

FIG. 2A-D illustrate several views of a schematic representation of a ratchet gear and back pad system of some embodiments of the present application;

DESCRIPTION OF THE PREFERRED EMBODIMENTS

The following description of the preferred embodiments of the invention is not intended to limit the inventions to these preferred embodiments, but rather to enable any person skilled in the art to make and use these inventions.

Overview

The embodiments of the present application seek to alleviate numerous problems related to existing head mounted display (HMD) systems including, but not limited to, eliminating the need for any kind of computer connection or tethering, allowing users to experience mixed reality (e.g., AR and/or VR) environments where the user is able to visualize their real world and other user environments in different locations, and implementing structures in the physical HMD that enhances the performance of the HMD. Being self-contained, many of the embodiments of the HMD disclosed herein are also modular allowing the use of multiple mobile devices, HMD, and depth sensors to suit a user's preferences thereby provide an enhanced immersive experience. By incorporating depth sensing technology into the HMD, the embodiments of the present application also have abilities to track a wireless color LED controller from the headset unlike current tracking technologies using cameras positioned off the headset.

Thus, the systems, apparatus, and methods disclosed herein function to bridge the gaps in the current state of HMD technology so that the VR and/or AR experience by a user of the novel embodiments of the HMDs disclosed herein is seamless and immersive. For instance, in some embodiments, a HMD weight distribution system is provided to allow a better HMD wearing experience for a user. In another example, a rigid sensor alignment system is provided for the HMD so that the sensor of the HMD remains rigidly align with a camera of an HMD or a mobile computing device implemented within the HMD thereby assuring more accurate representation of virtual and/or real objects in the user environment. In yet another example, a novel wireless color LED controller is provided that eliminates detection dead spots so that the HMD tracking system can always detect and/or be aware of a spatial location of the controller.

Accordingly, the head mounted display of the present application enables users to experience augmented reality in combination with virtual reality in an entirely new way by spatial mapping the user's surroundings so whether in AR or VR the user can be aware of the real-world environment around them called mixed reality. Users are also able to experience in stereo head mounted display live captured environments from other users and share their own environment as well.

Figure 1A:
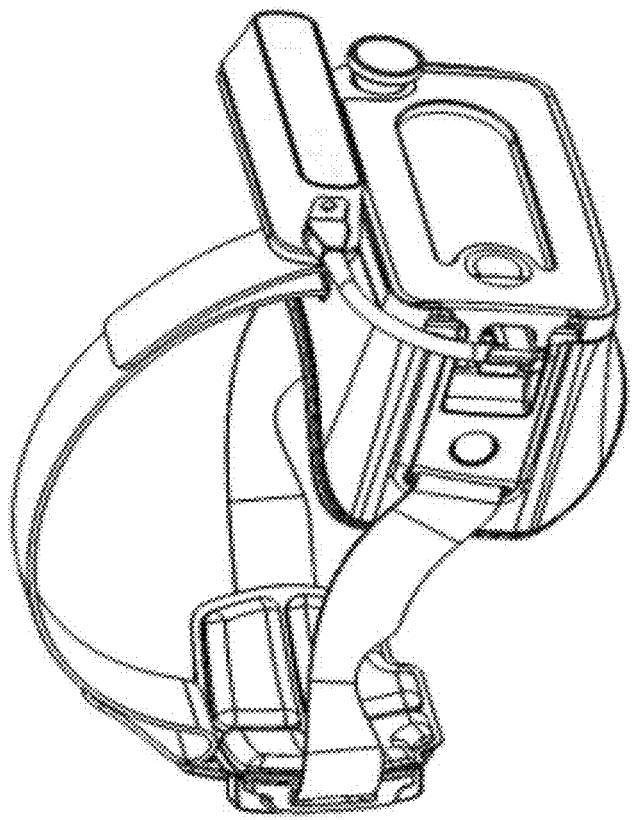
FIGS. 1A-C illustrate several views of a schematic representation of a head mounted display apparatus of some embodiments of the present application.
Figure 1A:
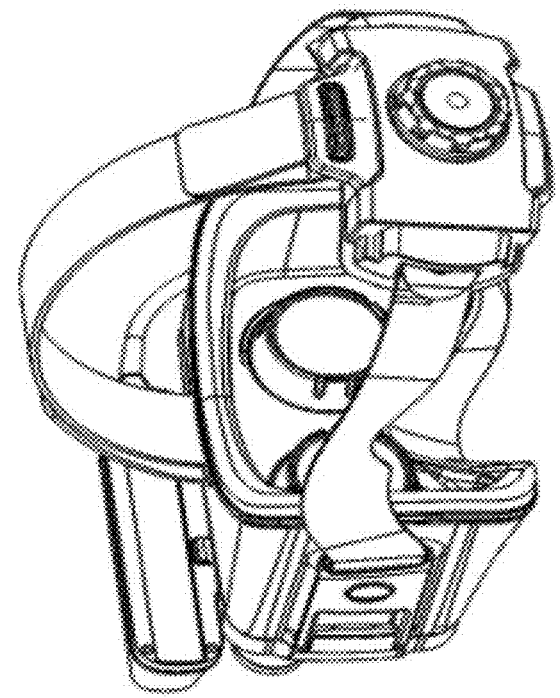
Figure 1B:
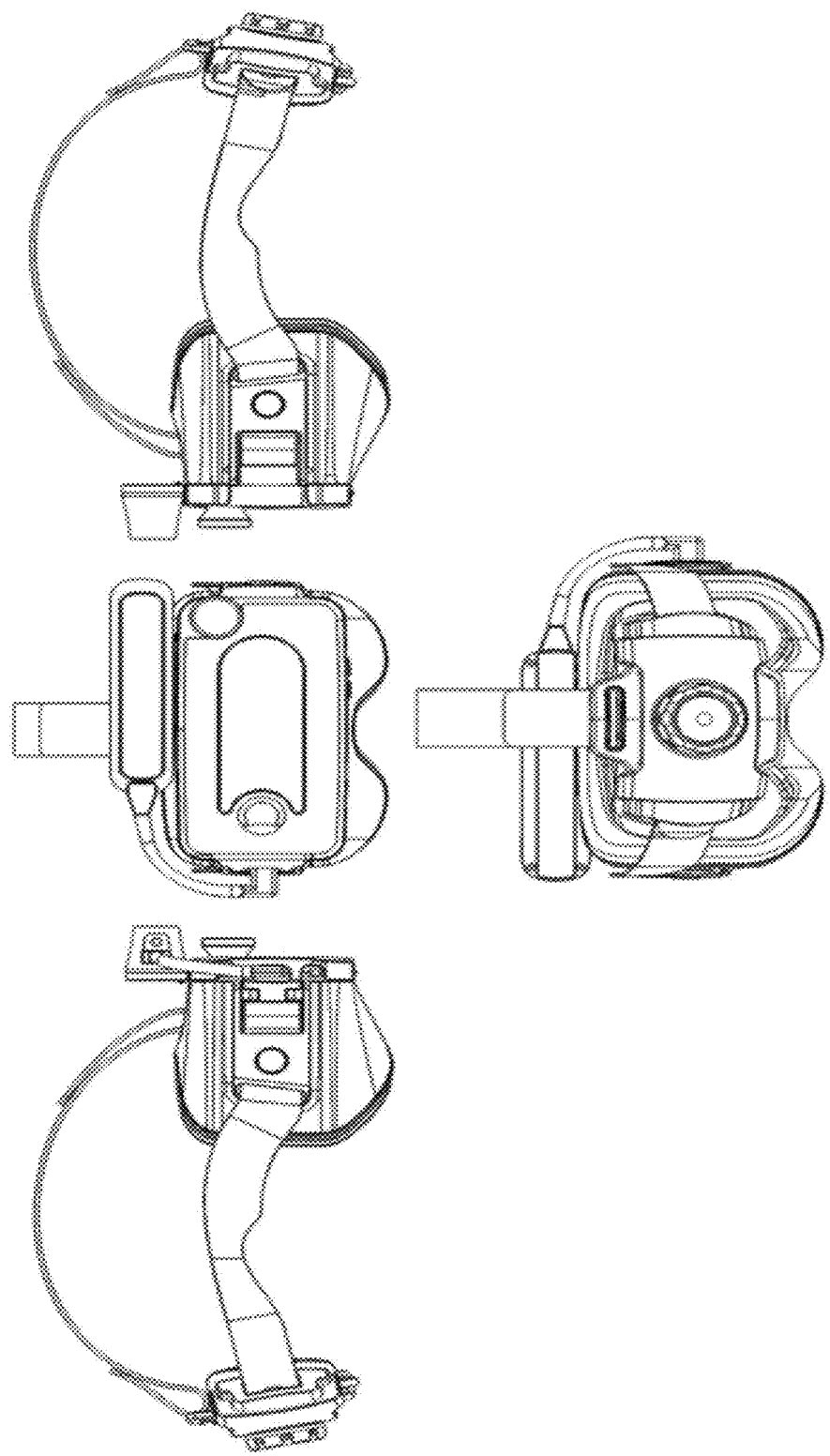
Figure 1C:
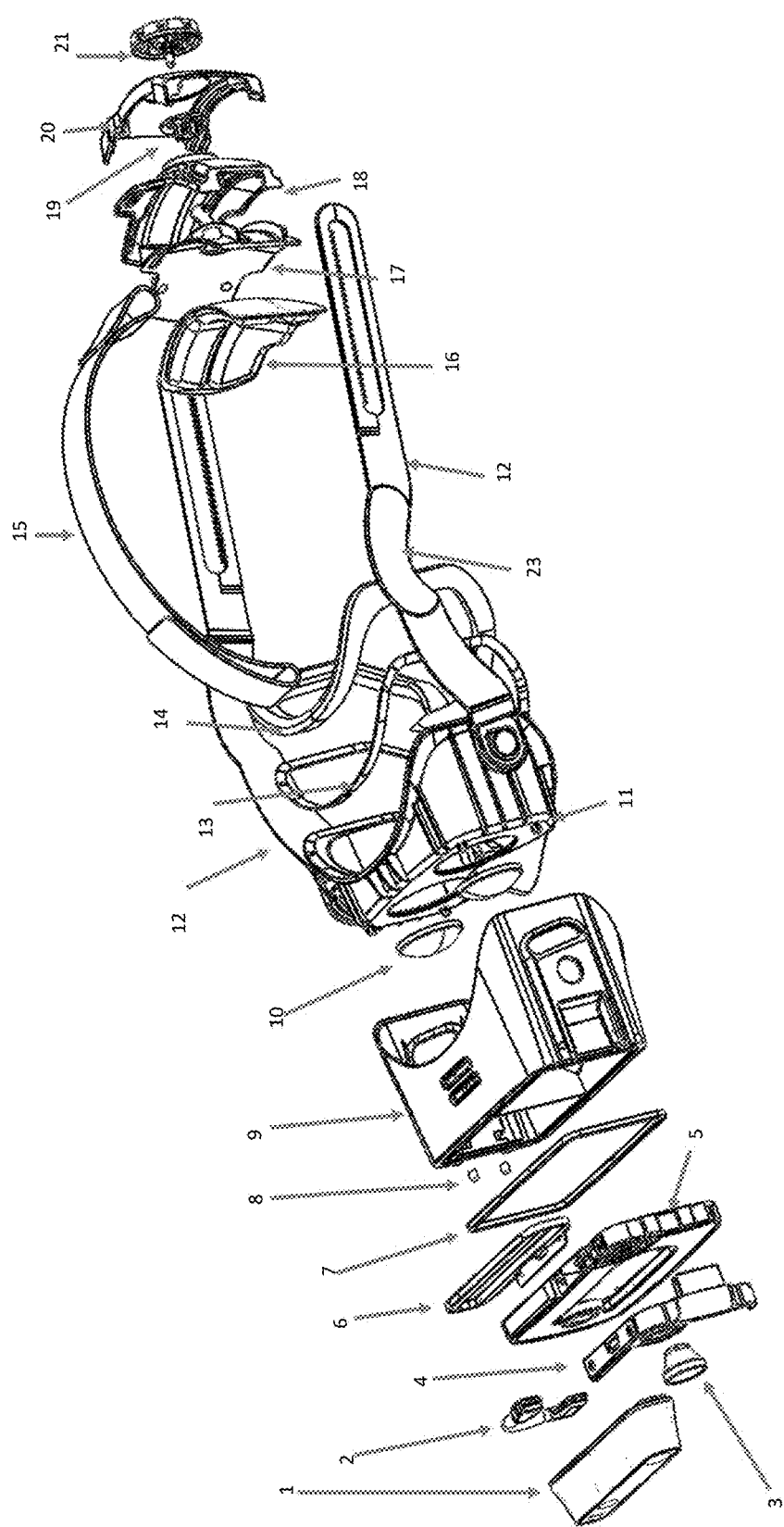
Figure 2C:
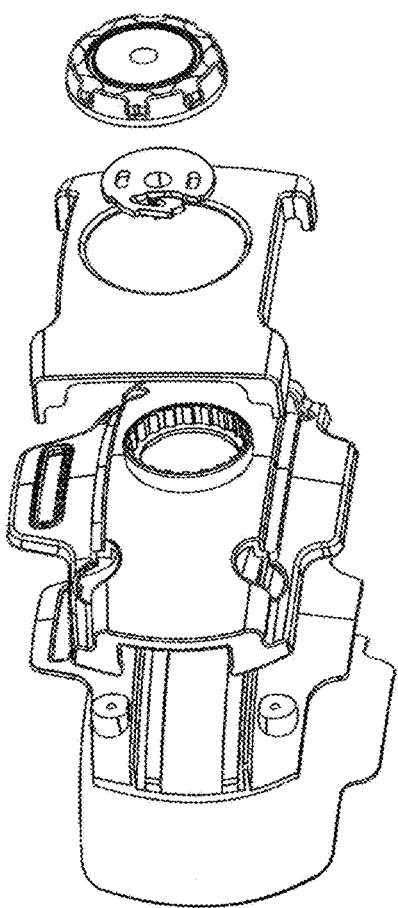
Figure 2D:
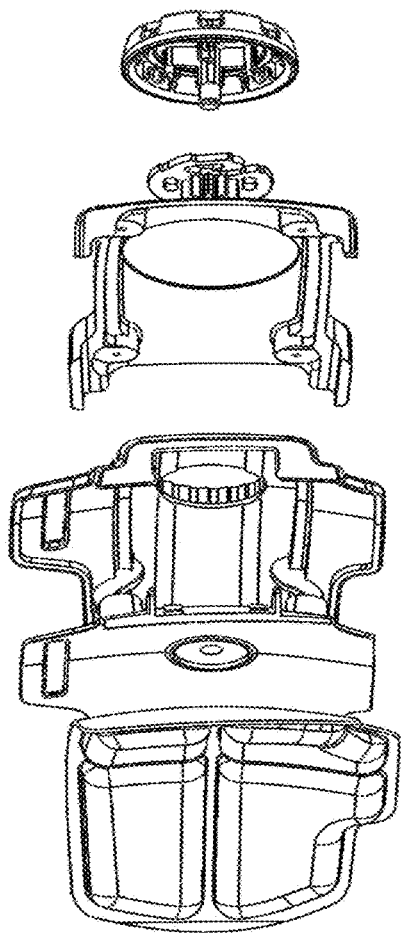

As shown in FIGS. 1A-C, several views of a head mounted display 100 are illustrated including an exploded view of a head mounted display 1000f the present application is illustrated. As illustrated in FIG. 1C, the head mounted display 100 includes in number of components that enable an enhanced mixed reality experience for a user. Specifically, the head mounted display 100 includes a structure sensor 1 (e.g., a depth sensor or the like), lightning cable 2, a wide vision lens 3, a hinge bracket 4, a door 5, a structure sensor mount 6, a gasket 7, magnets 8, a main body 9, one or more lenses 10, a mask 11, one or more straps 12 (e.g., a right strap and left strap, side straps, etc.), mask Velcro 13, face foam 14, a top strap 15, a back pad foam 16, a back pad insert 17, a back pad body 18, a ratchet gear 19, a counter weight 20, and an adjustment device 21 (e.g., adjustment wheel).

In general operation of the head mounted display, a user would typically download a mixed reality software application to their mobile computing device (e.g., a mobile phone, tablet, or the like). The user would then insert the mobile computing device into the door 5 of the head mounted display. Additionally, and/or alternatively, the door 5 may be any type of receptacle in which a computing device is held therein with different operating attributes than a door. Accordingly, the mobile computing device may be inserted into a receptacle. The user would then connect a structure cable for the head mounted display 100 to the sensor 1 of the HMD and separately, to the mobile computing device. The sensor 1 preferably comprises a structure sensor. The structure sensor may generally include a sensor inside, an emitter, computing processor, and battery or power source. The mobile computing device and the camera thereon will calibrate with the sensor 1 of the HMD and other components thereof.

Once the calibration of the mobile computing device and the HMD is completed, the user initiates the mixed reality software application available on the mobile computing device, usually prior to placing the HMD on their head. After the HMD is placed on the user's head, several adjustments can be made by the user for fit including adjusting the straps using the ratchet gear system by turning the adjustment wheel. The top strap 15 can also be adjusted so that the back pad may be positioned just below the occipital lobe on the head of the user. Then the user may optionally use the HMD wireless LED controller for connecting and/or pairing the controller to the head mounted display. Instructions for pairing/connecting the controller may be provided on the user HMD display screen. Once connected, the user can navigate through applications with the use of the wireless controller.

1. Adjustable Ratchet Head Strap System

As shown in FIG. 4, an adjustment mechanism 400 of a head mounted display 100 is illustrated. The adjustment mechanism 400 includes an adjustment device 21 that, when operated by a user, functions to fixedly secure the head mounted display 100 to an end user's head. Conversely, the adjustment can be used to unsecure the head mounted display 100 to the head of an end user. Additionally, the adjustment mechanism 400 includes weighted component 20 (e.g., a counter weight), a gear 19, back pad insert 17, and back pad body 18.

In a preferred embodiment, the adjustment device 21 is an adjustment wheel having a substantially circular shape. The adjustment wheel, in such embodiments, may be actuated or otherwise, rotated to adjust the fit of the head mounted display 100 on a user's head. Specifically, the adjustment wheel interacts with the gear 19 and is used to tighten or loosen the fit of the head mounted display 100 on a user's head by adjusting a length of the securing element 12 (e.g., securing straps) 12 that is used in making the fit. For instance, if the adjustment wheel is rotated in a first direction, this may cause the adjustment mechanism 400 using the gear 19 to pull on the securing straps thereby shortening the available length of the securing straps and consequently tightening a fit of the head mounted display. Conversely, if the adjustment wheel is rotated in a second and opposite direction to the first direction, this may cause the adjustment mechanism to release portions of the length securing straps thereby increasing or adding available length of the straps and consequently, loosening a fit of the head mounted display 100 on an end user's head.

It shall be noted that while the adjustment device 21 in some embodiments may be an adjustment wheel with a generally circular configuration, the adjustment device 21 can take on numerous different shapes and configurations so long as the adjustment device 21 is capable of being actuated by a user to interact with the gear 19 to tighten or loosen a fit of the head mounted display 100.

The adjustment device 21, in a preferred embodiment, operates in conjunction with the gear 19 to move the securing elements 12 in and out of position to tighten and/or loosen the fit of the head mounted display 100. The gear 19 is preferably a ratchet gear that mechanically allows linear or rotary motion of the securing elements 12 in a first direction while preventing motion of the securing elements 12 in an opposite direction. The ratchet gear of such embodiments includes only a single locking arm to engage with a mating profile of a back pad body 18 of a back pad system, the back pad system including at least the back pad body 18, the back pad insert 17, and the back pad foam 16. The single locking arm of the ratchet gear includes two hooks providing two hooking points to engage the back pad body 18 internal locking profile. By using two hooks rather than one hook on the single locking arm provides a stronger latching system relative to existing ratcheting systems. To release the ratchet gear arm from a secure or locked position, a pin 24 in the adjustment device 21 may be actuated allowing the single locking arm to move downward to unlatch from the back pad body 18 internal locking profile when a user actuates the adjustment device 21 in a direction opposite the locking/tightening direction (e.g., the user rotates the adjustment device 21 counter clockwise).

Additionally, and/or alternatively, by only actuating the adjustment device 21 in a counter motion or direction opposite than the motion or direction for tightening, the single locking arm of the ratchet gear releases the flexing arm down to unlatch from the internal locking/mating profile of the back pad body 18.

Accordingly, to adjust the tightness and/or looseness of fit of the head mounted device, upon actuation at the adjustment device 21, the single locking arm of the ratchet gear incrementally flexes along a circumferentially inner surface of the back pad body 18 having the internal locking mating profile, which includes a plurality of teeth along a circumferentially inner surface of the back pad body 18 used in mating with the single locking arm of the ratchet gear 19.

It shall be noted that while, in a preferred embodiment, a single locking arm is used in the ratchet gear, it is possible to implement a ratchet gear with two locking arms with each having a single hooking point. Similarly, the two locking arms can be further modified to include two hooking points to each arm.

2. HMD Weight Balance/Distribution System

Figure 3B:
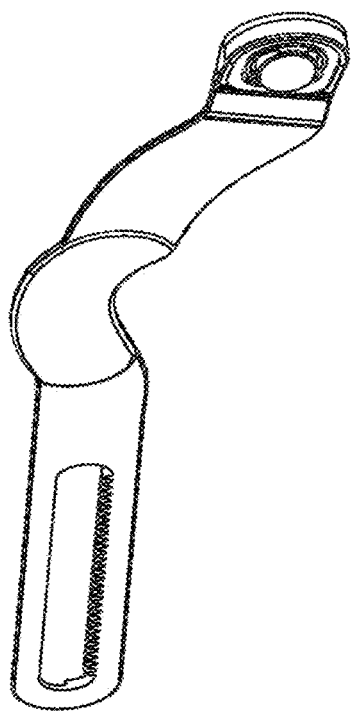
FIG. 3A-3B illustrate representative schematics of a counter weight and strap of some embodiments of the present application.
Figure 3A:
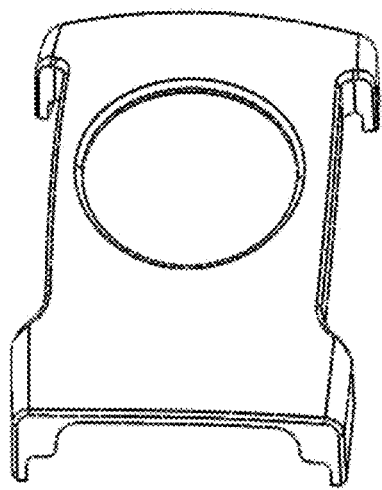

As shown in FIG. 3, the head mount display 100 includes multiple securing elements 12 or straps and a weighted component 20 that functions to allow weight of the head mount display 100 at a longitudinally forward portion and longitudinally rear portion of the head mount display 100 to be substantially balanced and distributed along the length of the head mount display 100. Specifically, the securing elements 12 of a preferred embodiment comprise semi-rigid straps that are uniquely shaped to extend from the main body 9 portion to a back pad system of the head mounted display 100 to aid in the transfer or distribution of weight along a length of the semi-rigid straps.

While in a preferred embodiment of the present application straps may be used as securing elements, other securing elements such as bands, lashes, belts, and/or the like may be used to physically secure the main body 9 portion and the adjustment mechanism 400 of the head mount display 100 to an end user. These other potential securing elements may also include the unique configuration that enables effective weight distribution in the head mounted display.

As mentioned above, the securing element 12 is preferably a strap. In such preferred embodiment, the strap operably connects the main body 9 portion of the head mount display 100 to the adjustment mechanism 400 or back pad system of the head mount display 100. Specifically, in this configuration, at least one strap is attached or connected to a first portion of the main body 9 of the head mounted display 100 and at least another strap is attached or connected to a second portion of the main body 9 of the head mount display 100 such that a user placing the head mount display 100 on their head can properly secure the head mount display 100 using the straps to securely pull the main body portion and the adjustment mechanism 400 towards their head using the straps.

It shall be noted that, in some embodiments, there may be more than one strap connecting each of the portions of the main body 9 portion to the adjustment mechanism 400 of the head mounted display 100. For instance, there may be two or more straps securing each lateral side of the main body 9 portion to the adjustment mechanism 400. Additionally, and/or alternatively, there may be a single strap which connects a first end of the single strap to a first lateral side of the main body 9 portion and a second end of the single strap loops through or around the adjustment mechanism 400 and then connects securely connects to a second lateral side of the main body 9 portion. It shall be further noted that multiple straps can be used where each strap is independent from another and each strap creates a distinct loop connecting each lateral side of the main body portion of the head mount display to one another.

The connection or attachment of the straps to the main body 9 portion of the head mount display 100 may be achieved in numerous different manners including by providing a loop at the end of each strap that connects to bar at the main body 9 portion of the head mounted display 100. Additionally, and/or alternatively, each of the straps may be interchangeable, replaceable, or removeable from the main body 9 portion. Thus, the straps are preferably removeably connected to the main body 9 portion. In such embodiments, the attachment end of each of the straps includes an attachment mechanism which may securely snap into place, securely lock, and/or securely slide into a secure connection with the main body 9 portion. Accordingly, each strap may include a mating portion which operably connects to a corresponding receiving or mating portion of the main body 9 portion.

The materials of the straps are such that the straps have some flexibility but are also rigid to effectively distribute weight along a length of the strap. Preferably, the material(s) of the straps comprises one or more types of nylon, which has sufficient strength for continuous and repeated used but also has a good feel. Additionally, and/or alternatively, the straps may be made of a plastics material and/or polypropylene and may also incorporate a variety of elastomers for flexibility. Further, the straps may be formed using a single mold even when forming the straps with nylon or other material. In this way, the entire strap has continuity and enhanced structural integrity along its length, which is also aids in the effective distribution of weight. However, it shall be noted that each of the straps may be formed in parts and later combined to from a single strand.

Additionally, in a preferred embodiment, an increased rigidity portion 23 is provided at a position along the length of each strap. The increased rigidity portion 23, in such embodiment, has an increased thickness that is greater than a thickness than the remaining portions of the strap. For instance, in some embodiments, the increased rigidity portion 23 of the strap may have a thickness of two millimeters (2 mm) or greater, whereas the remaining portion of the strap other than the increased rigidity portion 23 may have a thickness of one point eight millimeters (1.8 mm) or smaller. Thus, in many embodiments, the thickness at the increased rigidity portion 23 is at least ten percent (10%) greater than the thickness at the remaining portions of the strap.

Additionally, and/or alternatively, the increased rigidity portion 23 of the strap may be provided at a position on the strap that is closer to the adjustment mechanism 400 rather than the main body 9 portion of the strap. In this way, the increased rigidity portion 23 is provided at a position on the strap that is more susceptible to deformation (e.g., bowing or the like) due to use. Thus, the increased rigidity portion 23 may be used to rigidly restrain deformation at that position of the strap.

There are several technical advantages to such configurations in which an increased rigidity portion 23 is provided to the straps. A first technical advantage of providing the increased rigidity portions 23 is that the increased rigidity portion 23 provides additional resistance against deformation of the straps due to tensile or bending pressures applied to one or more segments of the strap. The increased rigidity portions 23, in some embodiments, are positioned along the strap at locations of the strap that are most susceptible to deformation, such as bowing and/or the like. Accordingly, in one example, the increased rigidity portion may be provided at a location near the ear of an end user of the head mount display as this location of the strap is susceptible to various deformations due to increased pressures applied near or at that segment of the straps.

A second technical advantage of providing the increased rigidity portion 23 to the strap is that due to the increased thickness and resulting increased rigidity and/or stiffness at the increased rigidity portion 23, it is possible to effectively distribute weight of the main body 9 portion (which may include the weight of the mask, computing device, and sensors and the like) along toward the adjustment mechanism 400 of the head mount display 100. Specifically, the increased rigidity portion 23 provides an increased resistance to one or more areas of the strap that are susceptible to deformation (e.g., bowing or the like) and as a result, the additional resistance at the increased rigidity portion allows for the weight or pressures that would otherwise affect the strap (e.g., excessive bending) at particular locations to pass or be maintained along the entire length of the strap rather than mainly at the deformation susceptible sections of the strap.

Additionally, and/or alternatively, the increased rigidity portion 23 is provided with curvature that rises above the remainder of the strap, such that weight is distributed along this rising curvature of the increased rigidity portion. A bottom and/or a top portion of the increased rigidity portion 23 are each provided with a continuous radius of curvature. By contrast, in some embodiments, the remainder of the strap other than the rigidity portion are not provided with a radius of curvature (e.g., the remainder of the straps are straight) or otherwise, are provided with smaller radii of curvature than at the increased rigidity portion. Alternatively, in some embodiments, only a top or a bottom portion 25 of the increased rigidity portion 23 is provided with curvature. Additionally, the continuous radius of curvature of the increased rigidity portion 23 has a larger radius of curvature at the bottom portion 25 and/or top portion of the increased rigidity portion 23 nearest to the main body 9 portion that decreases as along a length of the increased rigidity portion 23 moving towards the adjustment mechanism 400 of the head mounted display.

Accordingly, a third technical advantage of the increased rigidity portion 23 due to the curvature provided at this section of the strap is that the increased rigidity portion 23 is positioned and/or fits more comfortably around an ear of an end user of the head mounted display 100. Thus, the curvature of the increased rigidity portion 23 allows for a portion of the weight of the head mounted display 100 to be distributed along a greater portion of the ear of an end user thereby alleviating excess or a concentrated pressure at a limited or smaller area of the ear of an end user. Effectively, the curvature allows the increased rigidity portion 23 to wrap around a portion of an end user's ear, which, in turn, provides a greater area for the weight and/or pressure at the increased rigidity portion 23 due to the head mounted display 100 and the like to be spread along the portions of the ear of the user wrapped by the increased rigidity portion 23. By contrast, this novel weight distribution system most likely cannot be achieved with an unmodified straight strap or a strap without the proper curvature at or around the ear of an end user.

Additionally, and/or alternatively, each strap of the head mounted display 100 has a height dimension and a width dimension that causes each strap to be semi-rigid. The semi-rigid attribute of the strap allows for the strap to effectively distribute weight from the front of the head mounted display 100 to the back of the head mounted display 100. Generally, the strap has a height of at least 0.5 inches up to 1 inch or greater. Thus, the strap a height to width ratios that allows very limited flexing or deformation in the height of the strap relative to flexing in the width of the strap. In a preferred embodiment, the strap has a height of 1 inch and a width of 0.071 inches (e.g., 1.8 mm) to effectively limiting flexing in the height of the strap.

It shall be understood that while in a preferred embodiment specific heights and widths are described, it shall be understood that so long as the height to width ratio is large, the flex in the height of a strap will be limited.

Additionally, and/or alternatively, the weighted component 20 of the back pad system of the head mounted display 100 may be provided along with the multiple securing elements 12 to further enhance weight distribution and weight balance in the head mounted display 100. The main body 9 portion of the head mounted display 100 is large relative to the one or more elements at a rearward section of the head mounted display 100 and is usually positioned at front of an end user's head (e.g., at the face of an end user). The main body 9 portion also accommodates a computing device, such as a mobile computing device 200 of an end user. The mobile computing device 200 is preferably a mobile phone or tablet, but can be any type of known or existing mobile computing device known at the time of the present application. The mobile computing device 200 preferably includes a display interface, such as a touch screen or LED screen or the like. Additionally, and/or alternatively, the display interface comprises an electronic connection scheme (e.g., a connection point) or circuits which allow a separate device, such as a separate display element to interact with or connect to the computing device in order to electronic signals from the computing device which the separate display element translates into images in a mixed reality environment. Accordingly, due to the large size of the main body 9 portion coupled with the added weight of a mobile computing device 200 coupled therein, a significant forward weight and pressure normally exists at a front of the head mounted display 100. To counteract the weight of the main body 9 portion, a counterweight in the form of a weighted component 20 is added at the back pad system or oppositely at a rear of the head mounted display 100. Accordingly, it is not necessary that the counterweight is integrally included in the back pad system so long as the counterweight is provided at a rearward section of the head mounted display 100.

In a preferred embodiment, the weighted component 20 of the head mount display 100 may be made of a material, such as a casted zinc. The weighted component 20 may have a weight of approximately four ounces (4 oz.), which should be sufficient to counter balance the added weight of a user's mobile computing device 200 when inserted into the door 5 and/or the main body 9 portion of the head mounted display 100. It shall be understood that the weighted component 20 may be made of a number of different types of materials and/or metals and should not be limited to zinc and, may have varying weights depending on the configuration and weight of the main body 9 portion of the head mounted display 100 and coupled mobile computing device 200 of the user. The weighted component 20 may be additionally designed to integrate with one or more other components of the back pad system. For instance, the weighted component 20 may be designed to integrate with one or more components of the adjustment mechanism 400 and, designed to allow one or more straps through the weighted component 20 and/or around it.

Thus, the weighted component 20 together with the increased rigidity portion 23 of the straps allow for weight to be properly distributed along the head mounted display 100 and in a balanced manner with respect to the front and the back of the head mounted display 100. An aim of the weighted component 20 and/or the increased rigidity portion 23 of the strap is to balance the weight at the front of the head mounted display (with or without the mobile computing device 200) with the back of the head mounted display 100 (e.g., the back pad system). This effectively alleviates undue strains and pressure on the user's face due to the weight of the head mounted display 100 because in many instances of other head mounted devices, the weight at the front of the head mounted device exceeds the weight at the rear of the device causing a user to strain at the back of their neck or so to maintain an upright position of the head mounted device. However, with the head mounted display 100 weight balance and distribution system of the present embodiment, the strain at the neck of the user can be effectively eliminated or reduced. This, of course, mitigates user fatigue of the head mounted device.

Additionally, the back pad system of the head mounted display 100 hosts and/or integrates the adjustment mechanism, the weighted component 20, and one or more portions of the straps. In a preferred embodiment, a body of the back pad system is ergonomically positioned to the back of an end users head to further distribute weight of the head mounted display. Specifically, the weighted component 20 together with the other components of the back pad system, in some embodiments, do not exactly match the weight of the main body 9 portion of the head mounted display. In such embodiments, the back pad system of the head mounted display 100 is positioned ergonomically at a lower position of an end user's head than the main body 9 portion. The ergonomic positioning of the back pad system at a lower portion of the back of an end user's head allows for additional leverage for counterbalancing the increased weight of the main body 9 portion of the head mounted display.

Figure 4A:
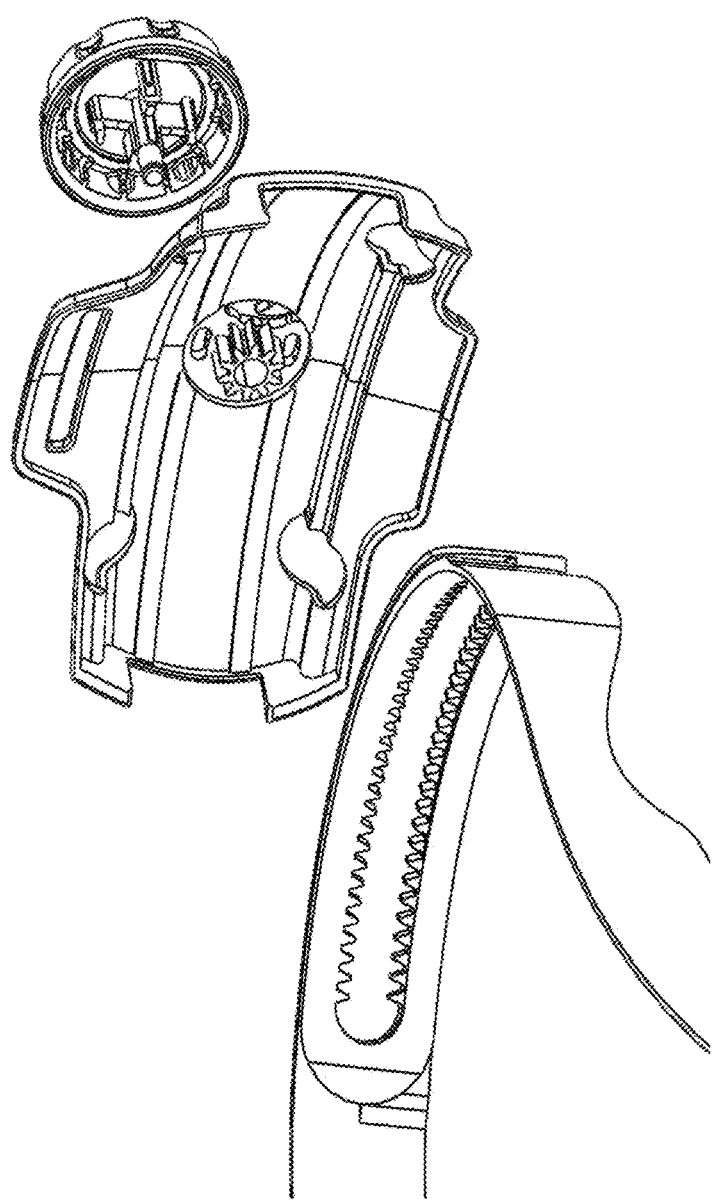
FIG. 4A-B illustrate representative schematics of positioning of a ratchet gear system and securing straps of some embodiments of the present application.
Figure 4B:
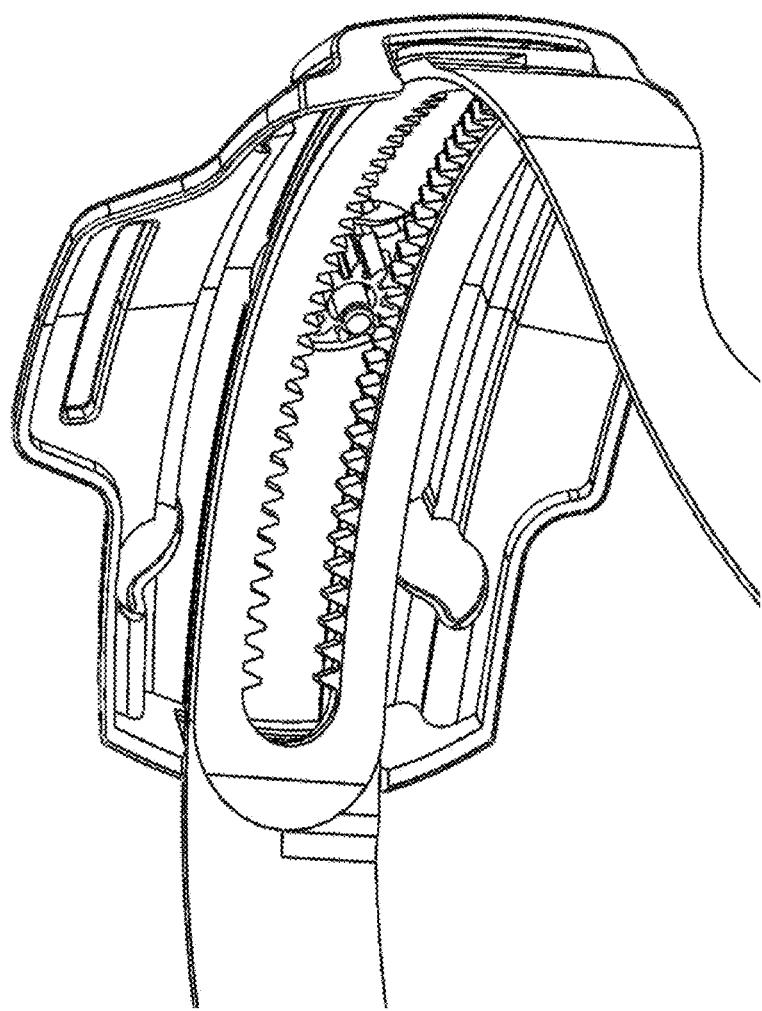

The back pad ratchet system in the head mounted display 100 functions in such a way, turning the adjustment wheel clockwise to tighten the side straps or turning the adjustment wheel counter clockwise to loosen, adjusts the overall fit of the head mounted display 100 on the user's head. As shown in FIGS. 4A-B, the ratchet gear which rests inside the adjustment device 21 has a tooth profile which interconnects with the right and left side straps inside the back pad body 18. Both the right and left side straps have a tooth profile engaging with the ratchet gear 19. The ratchet gear 19 remains continually engaged with the side straps and when the ratchet gear turns, it either pushes the side straps out of the back pad body 18 to loosen the fit on the user's head or pull the side straps into the back pad body 18 to tighten the fit on the user's head.

3. Rigid Sensor Alignment System

Figure 5A:
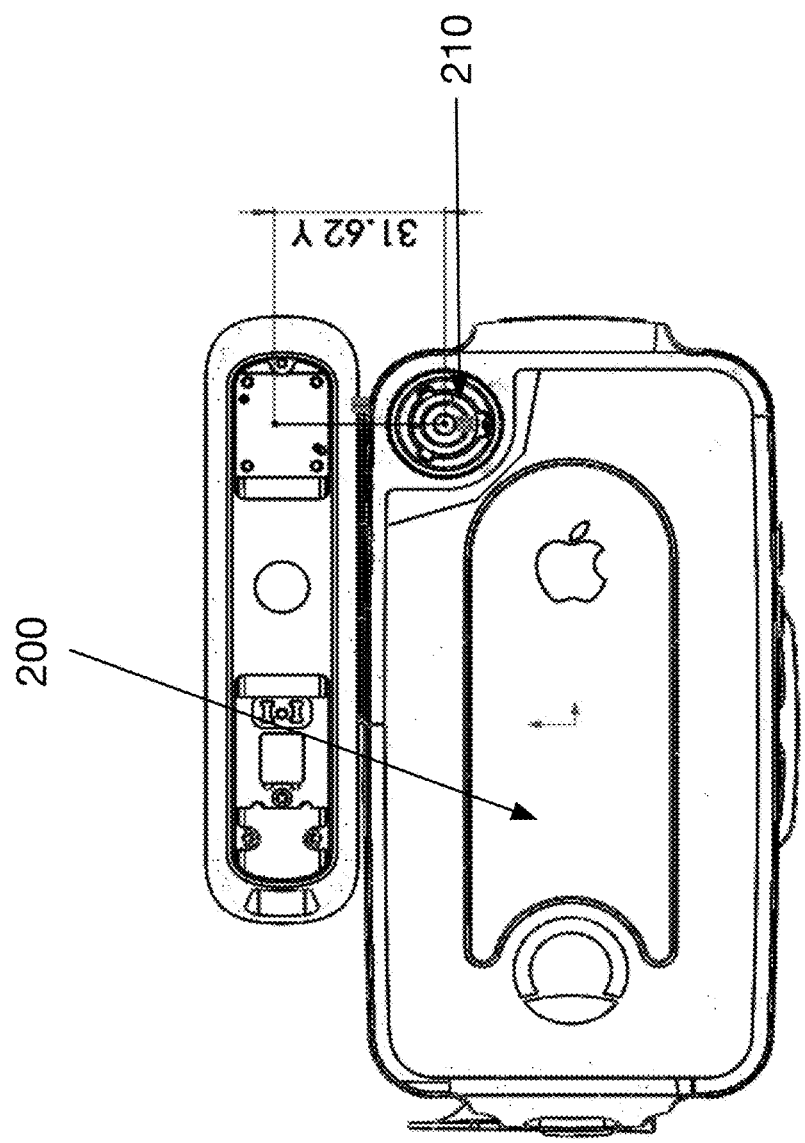
FIG. 5A-B illustrates representative schematics of a rigid alignment system of some embodiments of the present application.
Figure 5B:
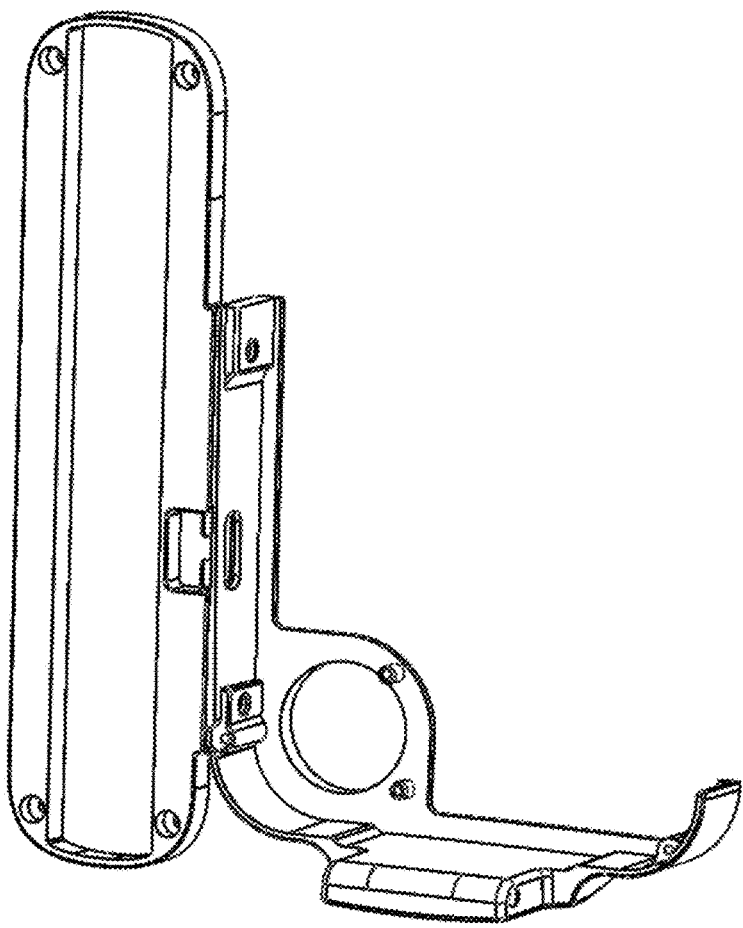

Referring to FIGS. 5A-B, a rigid sensor alignment system is provided that functions to maintain an alignment of at least the sensor 1 and the camera 210 of the mobile computing device 200 and optionally, also with the wide capture lens of the head mounted display. The rigid sensor alignment system allows for all three components including the sensor 1, the wide capture lens, and the camera 210 of the mobile computing device 200 to be aligned in x, which means that the center of each of the sensor 1, the wide capture lens, and the camera 210 are at zero (0) with respect to the x-axis. This, of course, allows for a consistent and enhanced mixed reality experience of the user.

More particularly, the repeated attachment and detachment of an end user's mobile computing device 200 from the main body 9 portion of the head mounted display 100 may cause incremental deformations at the main body 9 portion, mainly at the door 5 of the main body 9 portion if that is the location of the attachment of the mobile computing device 200. In such instances, the door 5 and/or other mobile computing device 200 attachment portions may be made of a type of plastics material or the like that may easily deform after one or more uses. Thus, causing irreparable damage to the sections at which the mobile computing device 200 of the user would typically attach. This type of damage usually cannot be repaired solely with calibration of the device. In fact, calibration and alignment of the sensor 1, wide capture lens, and camera 210 of the end user's mobile computing device 200 most likely cannot be achieved in the damaged state of the attachment portion for the mobile computing device 200, which is typically the door 5 of the head mounted display.

Accordingly, to resolve these deficiencies, a door 5 of the head mounted display 100 is modified to include a hinge bracket 4 having a generally L-shape and with increased rigidity relative to the remainder of the door 5. The door 5 of the head mounted display, in a preferred embodiment, is constituted mainly of two parts including a first part comprising a polycarbonate material (or similar plastics or the like) and a second part comprising a metal material, preferably an aluminum. The material of the second part having a higher stiffness or rigidity than a material of the first part and thereby being able to better resist deformation. The second part of the door 5 comprises the hinge bracket 4 and preferably, other portions of the door 5 including part of a face of the door and a top portion of the door at which the structure sensor mount is attached. Accordingly, because the second part of the door 5 comprises metal, preferably aluminum, the door 5 at the second part has an increased rigidity relative to the first part of the door 5 comprising a polycarbonate or the like.

The first part may be connected to the second part via a snap fit and/or using fasteners, such as screws. For instance, the first part and the second part may include mating elements at respective mating side faces of the first part and second part. Once pressed together, the mating elements would generally slide and fixedly snap into each other. However, for additional rigidity and/or security of connection between the first part and the second part, the first part and the second part may be additional mechanically joined together using screws, such as M1.6 screws or the like. The first part Thus, in a preferred embodiment, an aluminum hinge bracket 4 is provided that operably connects with a structure sensor mount 6, preferably made of a same material as the hinge bracket 4, preferably aluminum. The combination of the aluminum structure sensor mount 6 and the aluminum hinge bracket 4 of the door 5, which supports and/or hosts the mobile computing device 200, enables an increased sensor rigidity and therefore, rigidly maintains the alignment of the camera 210 of the mobile computing device 200, the wide capture lens, and the sensor 1 within the aluminum sensor structure.

This rigid configuration of the aluminum hinge bracket 4 and the aluminum sensor structure allows the sensor 1 (e.g., sensor infrared camera module, structured camera, etc.) and wide capture lens (e.g., wide vision lens) to remain in constant alignment in XYZ positions (e.g., with fixed displacements in one or more of the XYZ axes) with the camera 210 of the mobile computing device 200 through multiple uses of the head mounted display, which includes multiple times of attaching and detaching the mobile computing device 200 from the door 5 or the like of the head mounted display.

Accordingly, the rigid configuration of the aluminum hinge bracket 4 together with the aluminum sensor structure allows for several technical advantages including allowing the door 5 of the main body 9 portion of the head mounted display 100 to open and close multiple times, with the with the weight of the sensor 1, mobile computing device 200 (e.g., smart phone), and wide capture lens. This is achievable mainly because the metal and/or aluminum material reduces the risk of material wear over time.

It shall be noted that the door 5, while in a preferred embodiment is constituted of two parts including a rigid component and an increasedly rigid component (e.g., the aluminum hinge bracket 4), it is also possible to make the entire and/or majority of the door 5 from a single increasedly rigid component, such as aluminum.

Additionally, the aluminum structure sensor mount 6 may be operably connected to the aluminum hinge bracket 4 of the door 5 in a number of manners including using fasteners (e.g., screws); the aluminum hinge bracket 4 and the structure sensor mount 6 may be molded together as a single component; or the aluminum hinge bracket 4 and the structure sensor mount 6 may be integrally formed together by a weld or other means of integrally connecting the two components without the use of a fastener or the like; or the aluminum hinge bracket 4 may be slidably inserted and/or connected to the aluminum hinge bracket 4.

Additionally, and/or alternatively, each of the door 5 and the main body 9 portion of the head mounted display includes at least a pair of magnets. The magnets of the door 5 and the main body 9 are additionally aligned with each other such that one of the pair of magnets at the door 5 has a correspondingly aligned magnet at the main body 9. This is similarly true for the second magnet of the pairs for each of the door 5 and the main body 9.

The pair of magnets of the door 5 and the main body 9 are used to further enhance the rigid alignment of the sensor 1 and camera 210 of the mobile computing device 200 because the centers of the magnets will naturally align with each other therefore, providing a secondary level of alignment to the head mounted display system.

4. Modular Door (Sensor/Embedded Screen Attachment)

Figure 6A:
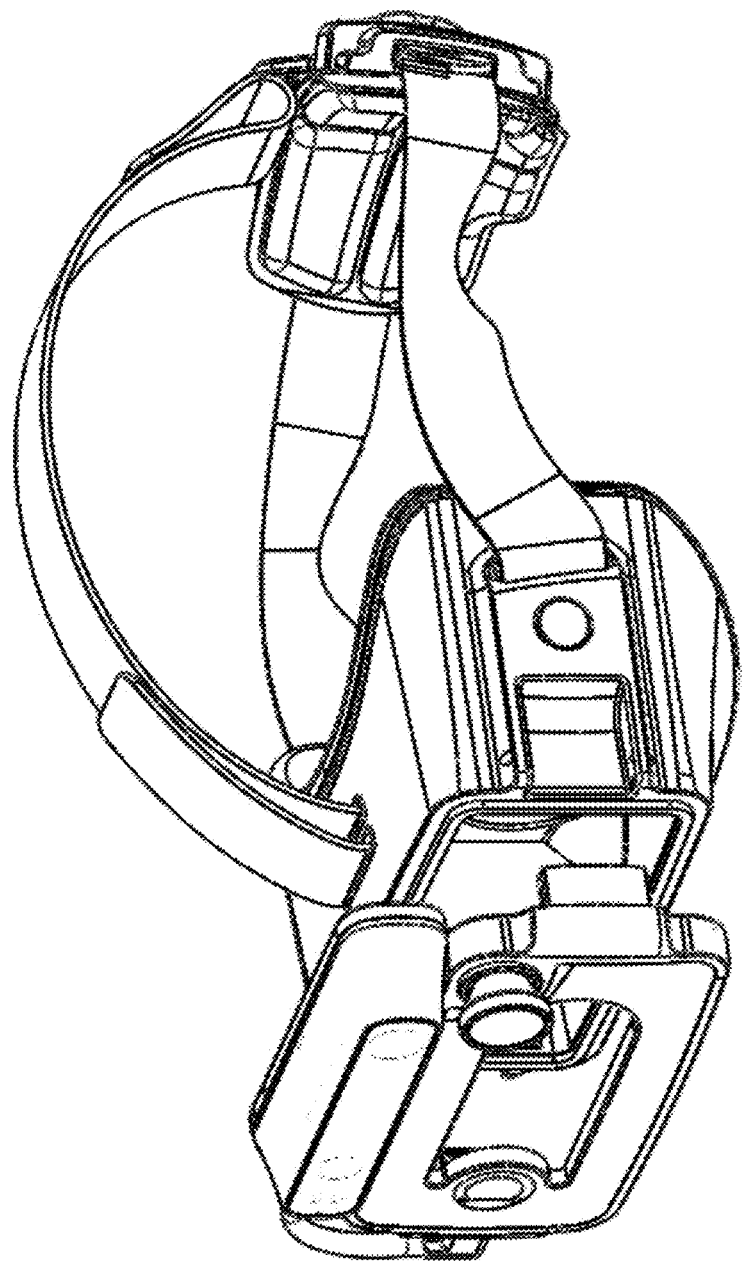
FIG. 6A-C illustrate representative schematics of a modular door system of some embodiments of the present application.
Figure 6C:
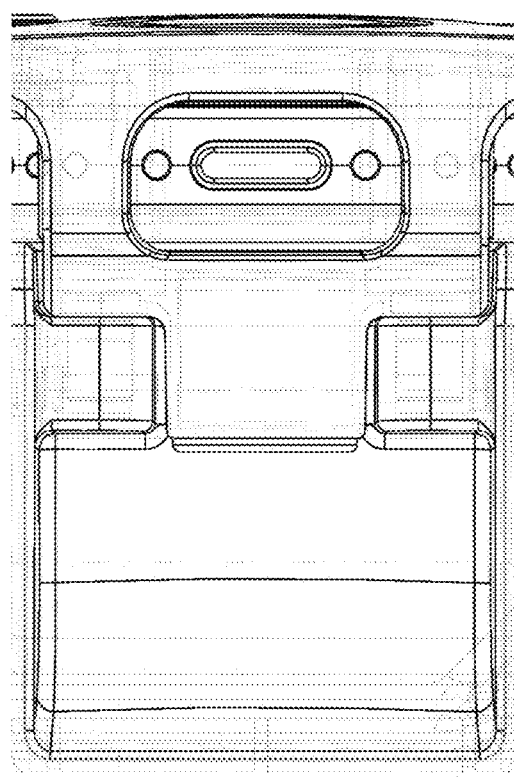
Figure 6B:
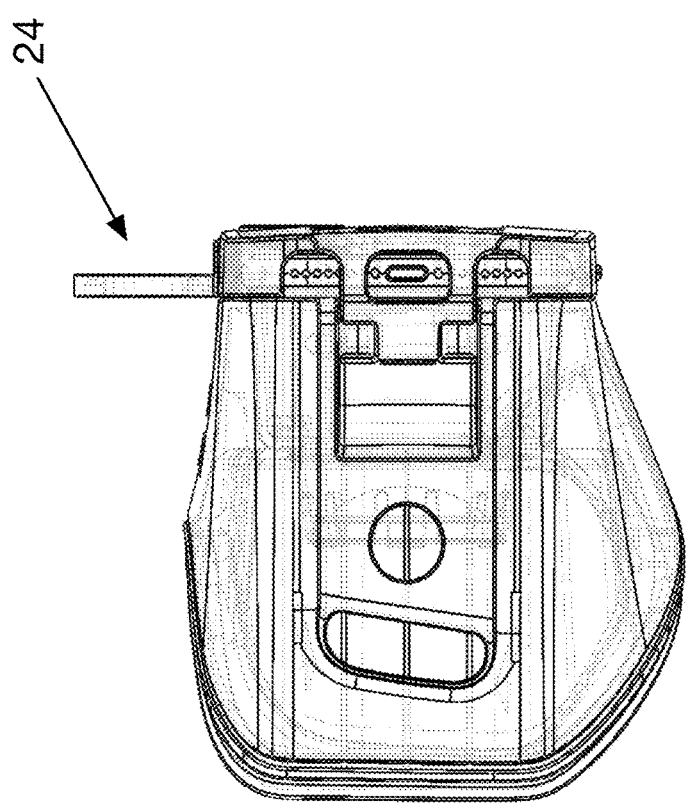

Additionally, in some embodiments, the door 5 of the main body 9 portion of the head mounted display 100 comprises a modular door, as shown in FIGS. 6A-C. The modular door of the head mounted display 100 may be readily attachable and detachable from the main body 9 portion. In this way, the modular can easily be replaced if damaged or replaced for other reasons including aesthetics and style of an end used. For instance, the modular door allows for doors for various phones sizes and shapes to be detached and re-attached to the main body 9 portion. Similarly, modular doors of various styles and colors may also be implemented or used.

In such embodiments, the head mounted display comprises one or more computing processors. The computing processors may be integrally included within the head mounted display or separate from the head mounted display but operably attached. For instance, the computing processors may be a separate component that is separately obtainable from the head mounted display and that has a tether to operably connect the computing processor to the head mounted display. The computing processor in such case is self-contained and portable such that the processor can fit in a typically-sized hand of a user (e.g., hand-sized or smaller computing processor). The portable computing processor may be mounted separately to shoulder of the user or the like so that the user may move around freely while using the head mounted display. The computing processor may also have an internal or external cooling system to maintain or control a temperature thereof.

Specifically, the modular door of a preferred embodiment includes a detachable/attachable hinge portion. The hinge portion of the modular door is configured to connect to and to removeably disconnect from a hinge receiving portion of the main body 9 portion of the head mounted display. The hinge portion of the modular door may include snapping component that snap fits into the hinge receiving portion of the main body 9 portion. In this way, once the hinge portion of the modular door and the hinge receiving portion of the main body 9 portion are aligned, the two components can be pressure-fitted or snap-fitted into place. Similarly, pressure can be applied to unhinge and/or detach the hinge portion of the modular door from the hinge receiving portion of the main body 9 portion.

Figure 11:
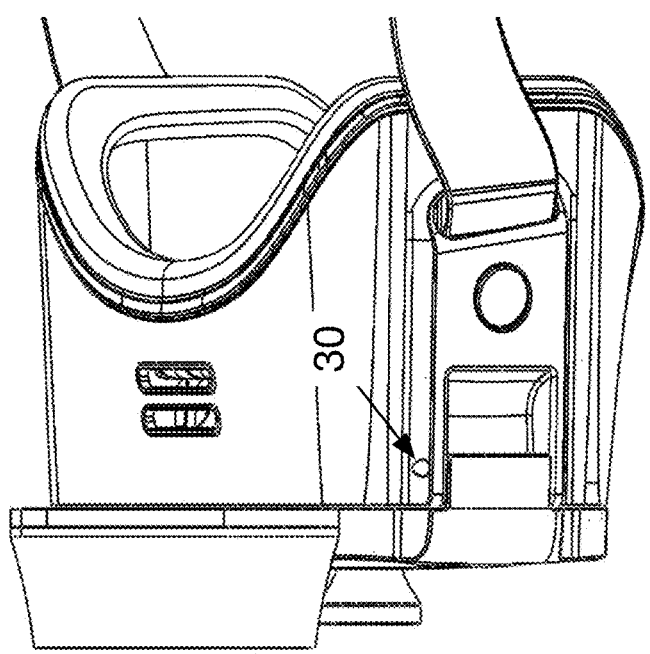
FIG. 11 illustrates a representative schematic of a head mounted display having a securing hole for a modular door system according to some embodiments of the present application.
Figure 12B:
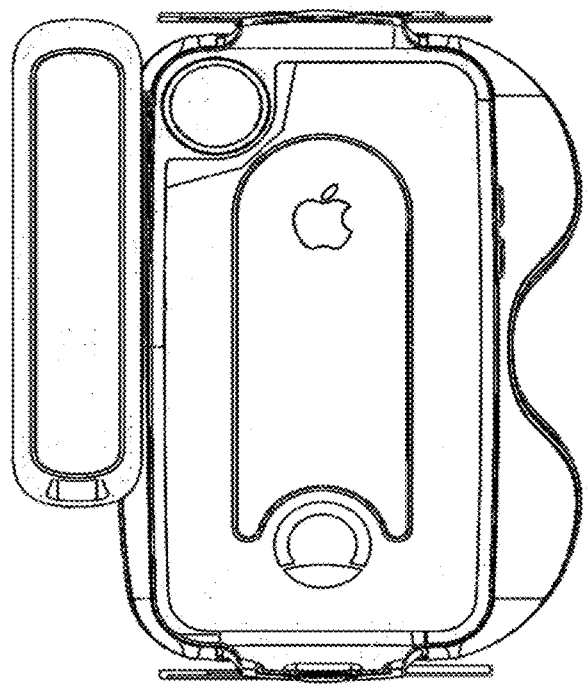
FIGS. 12A-B illustrate a representative schematic of a head mounted display having a modular sensor of some embodiments of the present application.
Figure 12A:
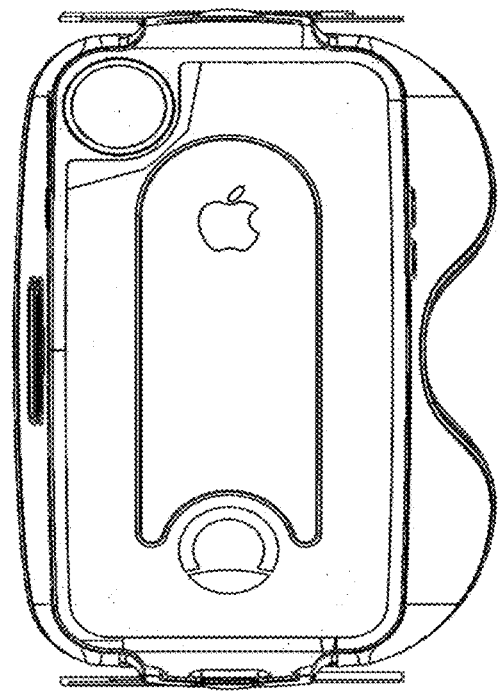

Additionally, and/or alternatively, the hinge portion of the modular door may be secured to a hinge receiving portion of the main body 9 portion using one or a combination of locking mechanisms. In a preferred embodiment, the hinge portion of the modular door is placed into alignment with the hinge receiving portion of the main body 9. In the aligned state, the hinge portion includes a through hole 30 that coaxially aligned with one or more through holes of the hinge receiving portion. The hinge receiving portion preferably includes at least one through hole and a second hole opposite of the at least one through hole. In the aligned state, a pin 24 may be first inserted into the at least one through hole 30, as shown in FIG. 11, of the hinge receiving portion, which would pass through the through hole 30 of the hinge portion of the modular door and lastly into the other hole of the hinge receiving portion. The pin 24 may be secured into place using pressure or press fitting in combination with other securing mechanism. For instance, additionally and/or alternatively, each of the hinge portion of the modular door and the holes of the hinge receiving portion include threaded portions. In such embodiment, a screw having mating threads can be screwed into the holes of the hinge portion of the modular door and the holes of the hinge receiving portion of the main body 9 in an aligned state.

Alternatively, the hinge receiving portion may include two threaded through holes, such that a screw can be inserted into each of the two threaded through holes and into the through hole 30 of the hinge portion of the main body 9 to secure the modular door into place.

It shall be understood that the pin and/or the screw(s) used in fixing the modular door to the main body 9 portion may be readily accessible without obstruction and/or viewed without obstruction, such that an end user may easily engage the pin and/or screw(s) to remove them in order to detach the modular door. For instance, a top portion of one or more screws used to fix the modular door into place is unobstructed and viewable without having to manipulate the head mounted system so that the user can easily apply a screw driver or other tool that can be used to disengage the one or more screws from the through holes of the hinge receiving portion and hinge portion of the modular door.

Additionally, and/or alternatively, in some embodiments, the sensor mounting structure is also modular thereby allowing the sensor mount and sensors therein to be readily detached and re-attached or simply updated as time progresses. Such a configuration, therefore, allows a user of the head mounted display 100 to be able to update and/or continually upgrade the sensor 1 and/or otherwise, change the sensor mounting structure for alignment reasons to better match or align with the changing positions of mobile computing device cameras or the like.

In yet another embodiment, a modular door is provided with an embedded screen and computing processors which can be used in lieu of a mobile computing device 200. Thus, eliminating the need to insert and remove a mobile computing device from the door 5 of the head mounted display. Such embodiment, of course, provides added technical benefits of alignments between the sensor 1 and the camera of the door 5 and/or embedded screen that have higher accuracy since the embedded screen is not removeable thereby improving a user's mixed reality experience.

Additionally, and/or alternatively, the lenses 10 may be interchangeable within the main body 9 of the head mounted display. Specifically, in some embodiments, a profile of a receptacle (e.g., lens cup) which holds each of the lenses 10 is designed such that it is detachable and re-attachable (e.g., modular) to the main body 9 and/or mask 11. In this way, lens cups with varying profiles may be provided so that a user can attach different lenses 10 therein. Thus, a user requiring corrective lenses or contact lenses may be able to insert prescription lenses within the lens cup to avoid having to wear glasses while wearing the head mounted display 100.

Additionally, and/or alternatively, the lens cup may generally have a circumferential configuration such that the lens cup may be received in a similarly configured circular portion of the mask 11. As shown in at least FIG. 1C, the lens cup is the circular portion attached to the circumferential edges of the lens 10. Thus, the lens 10 may be detached from this lens cup.

While the lens cup shown in FIG. 1C may generally have a circular profile and attached to the lens 10, it shall be understood that the lens cup may have any shape or configuration (e.g., square configuration or the like). In such instances, a face or profile of a face of the non-circular lens cup may be formed with a generally circular receiving section for a lens.

5. Color LED Controller Tracking System

A problem with various wireless LED controllers is that the positions of the LEDs on the controller are not comprehensive or effectively positioned and thus, when being detected there is an increased possibility of an occurrence of a dead spot. A dead spot in such instances occurs when a user manipulates the controller in a specific manner such that a sensor or the like on a head mount cannot detect any of the LEDs on the controller. For instance, turning a typical wireless LED controller to a side in which none of the LEDs of the typical controller face a sensor 1 on a head mount would result in the sensor 1 failing to detect any of the LEDs and correspondingly, the intended action of the user of the controller. Embodiments of the present application resolves this problem.

Figure 7A:
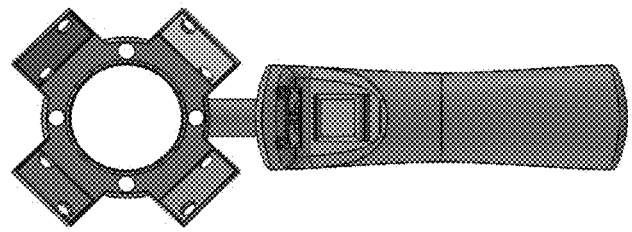
FIG. 7A-B illustrate several views of schematic representations of a wireless controller of some embodiments of the present application.
Figure 7A:
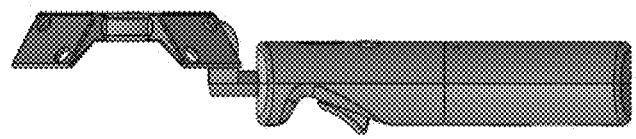
Figure 7A:
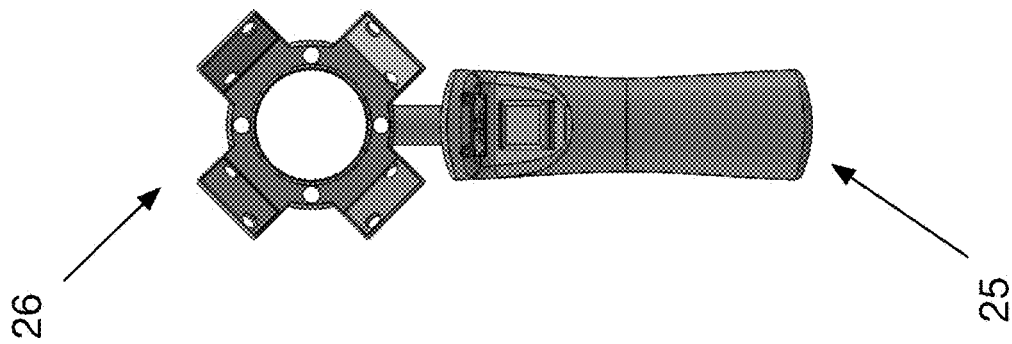
Figure 7B:
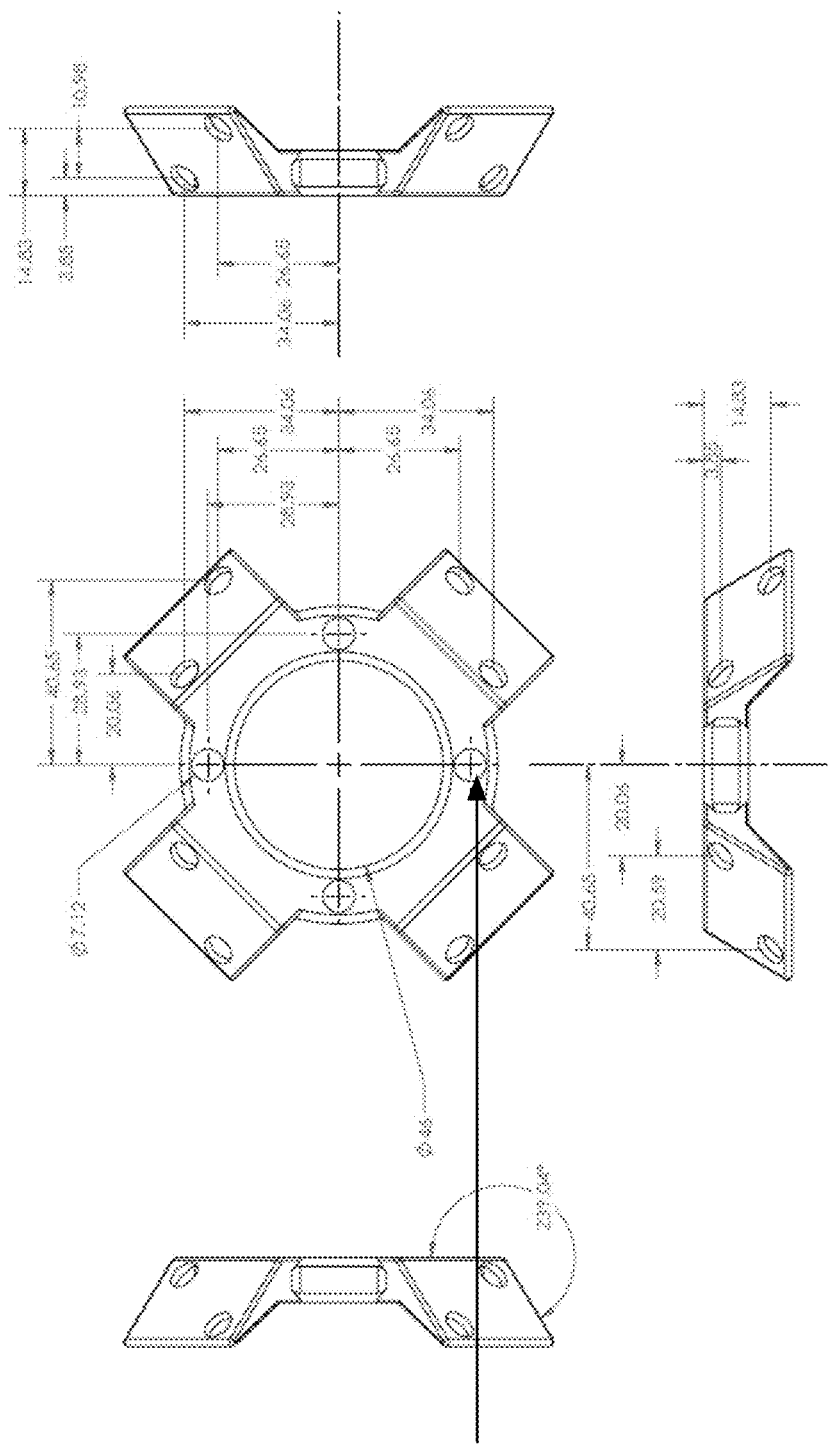

As shown in FIGS. 7A-B, portions of the wireless modular LED controller are provided with a number of LEDs having various colors from red, green, blue, yellow, and purple that are specifically positioned on the controller for purposes of differentiating various portions and segments of the controller. In a preferred embodiment, the circular face portion of the top portion 26 of the wireless modular LED controller includes the colors, red, purple, blue, and yellow in that order moving in either a clockwise or counter clockwise direction of the face. At least two of the flanges, preferably the two flanges at the top of the top portion 26 will include as diagonal pairs, LEDs displaying the colors green and blue, with the blue color LED being further away from the circular face of the top portion 26. In such preferred embodiment, the at least other two flanges, preferably the two flanges at the bottom of the top portion 26 will include as diagonal pairs LEDs displaying the colors purple and red, with the red LED being further away from the circular face of the top portion 26. It shall be understood that the specifically disclosed colors of the top portion 26 of the controller may be moved around into a different configuration and is not limited to the specific configuration disclosed.

Although, it is also noted that the specific color configuration provides optimal detectability by the sensor at the head mounted display because the different colors can be easily mapped and differentiated for the purposes of identifying specific segments of the wireless controller.

By providing differing colors at the specific locations of the wireless modular LED controller, the sensor 1 at the head mounted display 100 can detect these varying color positions and use a mapping of each of the colors to particular sections of the wireless LED controller to identify which segment of the wireless modular LED controller is being detected. Thus, the sensor 1 on the head mounted display 100 can readily identify which specific section of the wireless modular LED controller is being detected. The technical advantage of such configuration is that when the wireless LED controller represents a virtual element in a mixed reality experience, the sensor 1 can better identify with high accuracy exact locations of the real-world component and convert those locations into corresponding virtual representations in the mixed reality experience. Thus, reducing and/or eliminating an occurrence of dead spots when the sensor 1 of the head mount is attempting to detect an action of the LED controller based on sensing one or more locations of one or more sensors of the LED controller.

As described in more detail below, the LEDs of the wireless LED controller are strategically placed in a designated or predetermined pattern that optimizes the opportunity for the structure sensor 1 of the head mounted display 100 to detect the positions thereof.

Additionally, and/or alternatively, for each of the LEDs strategically placed on the wireless LED controller, a specialized diffuser system is provided. The specialized diffuser system implements one or more specific materials, such as a gel or other diffuser material, that enhances color LED detection and classification. For instance, the material of the specialized diffuser system may be applied as a cover to each of the LED positioned on the wireless LED controller. In such instance, when the light from the LED passes through the material of the specialized diffuser system, the diffusing material 31 effectively spreads the light of the LED evenly and/or more pronouncedly across a surface of the material covering the LED.

The material of the specialized diffuser system may be a gel-like material having optical clarity and material properties that effectively diffuse incoming light across its surface area. The material of the specialized diffuser system may be removeably applied to a surface of each of the LEDs. Additionally, and/or alternatively, the material of the specialized diffuser system may be formed in a cap or a lid that can be placed at each LED of the wireless LED controller.

6. Modular Wireless LED Controller

As shown in FIG. 7B, a wireless modular light-emitting diode (LED) controller is provided to be used in conjunction with the head mounted display 100. The modular LED controller functions to augment the mixed reality experience of the end user of the head mounted display 100 thereby allowing the user to interact with the physical controller in his physical environment where that real-world interaction with the modular LED controller is converted into one or more virtual actions in the mixed reality experience being viewed in the head mounted display.

Preferably, the modular wireless LED controller is modular in the sense that a top portion 26 of the modular LED controller having a plurality of tracking LEDs is removable and/or otherwise, can be detached and re-attached to a bottom portion 25 of the modular LED controller. The bottom portion 25 of the controller may include a handle and one or more input features, such as buttons or the like, that the user can manipulate to perform one or more real world actions that can be converted into virtual actions in the mixed reality experience.

Accordingly, the top portion 26 of the modular Led controller can be alternated or changed to different controller top portions with different LED configurations, different LED colors, shapes, and the line. For instance, in preferred embodiments, red, green, blue, yellow, and purple LEDs may be implemented in a top portion 26 of a controller to provide optimal detection opportunity by the sensor 1 provided at the head mounted display. However, these colors may be alternated to use a different combination that is necessarily different. Additionally, controller top portions with infrared LEDs may be optionally implemented.

Thus, because the wireless modular LED controller is modular in nature, one or more various gaming devices, lifestyle, and/or athletic accessories may be attached to either the bottom portion 25 or the top portion 26 of the modular controller.

As shown in FIG. 3, the top portion 26 of the controller may have a first main portion with generally a circular configuration; however, it shall be noted that the circular configuration could easily be square-shaped, triangular-shaped, or the like which best suits the application or mixed reality experience of the user. A circumferential face of the controller top portion 26 may include a specifically designated number of LEDs, which is designed to limit the total number of LEDs used while allowing optimal sensing and capture by the sensor 1 of the head mounted display. In a preferred embodiment, a number of LEDs included in the circumferential face of the top controller portion is four (4), where the four LEDs are spaced equidistant from each other and each optionally, positioned between two extending flange portions.

Additionally, in FIG. 3, it is illustrated a number of flange portions extending from a circumferential edge or end face of the top controller portion. In particular, each of the extending flange portions extends at an angle opening acutely and oppositely the face of the controller. The angle of extension of each of the extending flange portions is such that the controller can be turned to its side where the LEDs at the face may not be visible to a sensor 1 but the LEDs at the face of the extending flange portions can still be viewed by the sensor 1 of the head mounted display. Thus, a technical advantage of the configuration of the extending flange portions is that even when the face of the controller is not visible due to some manipulation by the user, it is possible to detect the positioning of the controller by the sensor(s) within the head mounted display 100 by detecting the LEDs of the extending flange portions that are visible even when the controller is manipulated in such a manner that the face of the controller cannot be detected or is otherwise not visible to the sensor 1 of the head mounted display.

Additionally, the specific configuration and positioning of the LEDs on the extending flange portions are provided such that the LEDs are diagonally opposite of each other rather than being aligned in x or y. A benefit of this configuration is that because the LEDs are diagonal and not aligned in the x or y, it is less likely that the sensor 1 will mistakenly confuse the two or more LEDs as one. In a configuration in which the LEDs are aligned in the x or y, it is possible that the sensor 1 may confuse the two LEDs for a single LED because of the alignment in the x or y.

7. Extended Power Supply

In existing head mounted devices, the primary sources of power consumption include the sensor 1 of the head mounted device and the mobile computing device, such as a mobile phone of the user. In such cases, the mobile computing device 200 usually consumes a great amount of power relative to the sensor 1 due to the extensive processing the mobile computing device 200 must perform for generating a mixed reality experience. However, in current head mount devices, both the sensor 1 and the mobile computing device 200 must be plugged in for charging using separate charging elements or sources that may be tethered to a wall outlet or to external power sources outside of the head mount device. This can be a significant inconvenience to the mixed reality experience of the end user of a head mounted display 100. The embodiments of the present application, as described below, address these issues.

Figure 8:
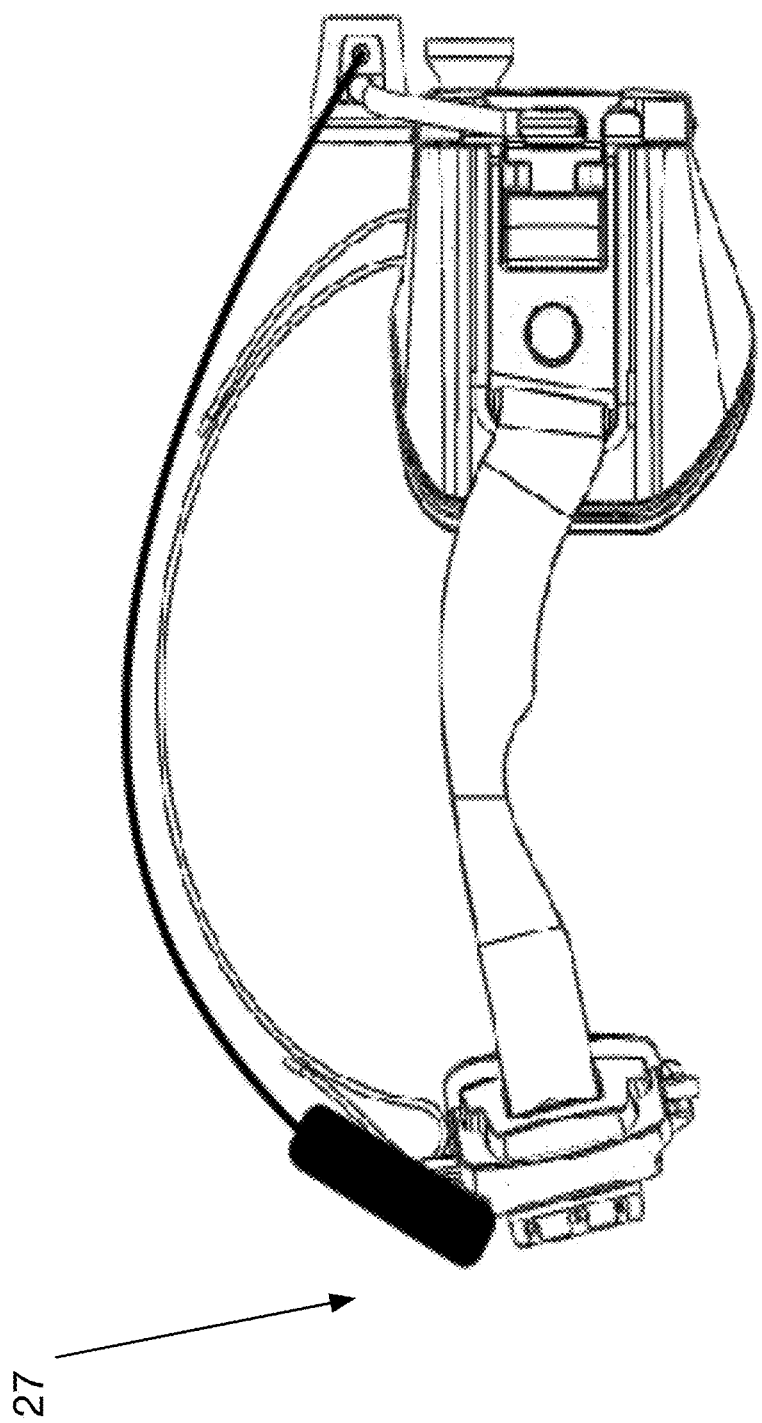
FIG. 8 illustrates a representative schematic of an extended power supply system of some embodiments of the present application.
Figure 9:
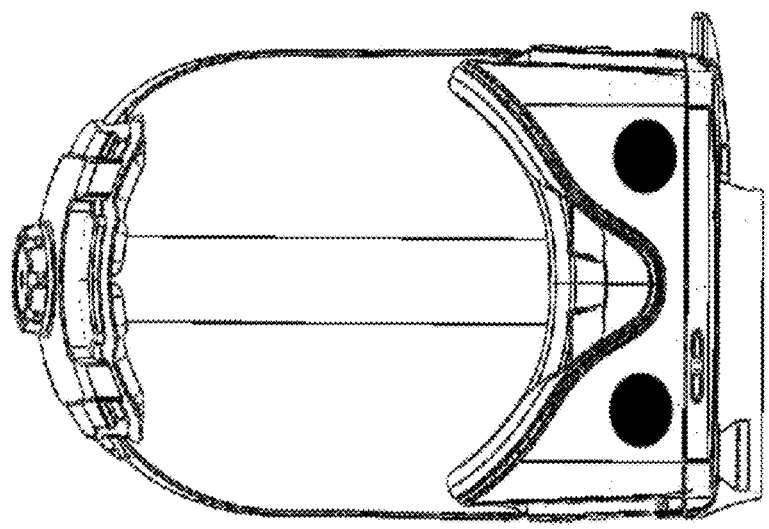
FIG. 9 illustrates representative schematics of positioning of haptic feedback sensors of some embodiments of the present application.
Figure 9:
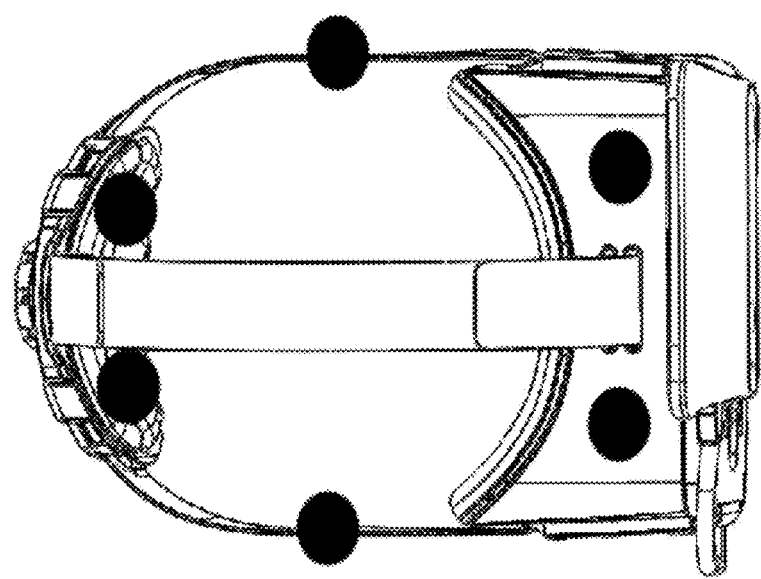

As shown FIG. 8, an embedded power supply system/source 27 is provided which includes a rechargeable power block and a power transferring system that is not tethered to an external power source, such as an outlet or large battery. The power transferring system may include one or more computing processors and power detectors and the like. The power block, preferably, includes a rechargeable battery. The power block, in some embodiments, is provided at the back pad system of the head mounted display. The power block may be designed to fit integrally with the weighted component 20 and adjustment mechanism 400. The power transfer system of the embedded power supply system, preferably, includes a single power transfer cord operably connected to the power block and further, to at least the sensor 1 and/or the mobile computing device 200 of the head mounted display.

In some embodiments, the embedded power supply system continuously powers the sensor 1 and the mobile computing device 200, preferably simultaneously. Alternatively, the embedded power supply system periodically powers one or both sensor 1 and the mobile computing device 200 based on one or more detected attributes of the head mounted display system.

For instance, in some embodiments, the sensor 1 of the head mounted display 100 can detect an external power level of the mobile computing device 200 through circuity connecting the sensor 1 and the mobile computing device 200. In such cases, the sensor 1 may be able to trigger or cause the embedded power supply system to automatically begin to charge the sensor 1, itself, and/or the mobile computing device 200 based on the sensed power levels. The sensor 1 can detect the power level of the mobile computing device 200 and when the sensor 1 determines that the mobile computing device 200 requires additional power, the sensor 1 can send an electrical signal to the embedded power supply system to initialize charging of the mobile computing device 200. Of course, the sensor 1 is also able to determine its own power level and similarly, provide a signal to the power supply system for charging the sensor 1.

In a preferred embodiment, there is only a single power cord which transmits power between the power supply system and both the sensor 1 and the mobile computing device 200. Thus, it is necessary that, through the single power cord, the power supply system can effectively and adequately charge both the sensor 1 and the mobile computing device 200 at the same time. Thus, in such embodiment, the power supply system is charging both the sensor 1 and the mobile computing device 200 using a single cord, the power supply system may be programmed to differentiate between the amount of power supplied to the sensor 1 and to the mobile computing device 200 during a same charging session. Accordingly, the power supply system can detect which power necessary element (e.g., the sensor or the mobile computing device 200) requires more power based on a sensed power level of each of the sensor 1 and mobile computing device 200. It is more likely in most embodiments that the mobile computing device 200 will require more charging and thus, the power supply system may send a single amount of power (Po) that may be split into P1 and P2 for each of the sensor 1 and mobile computing device 200, respectively, where P2 for the mobile computing device 200 is greater than P1. In such cases, the power supply system can send a signal to either the sensor 1 or the mobile computing device 200 indicating how much of the single power amount Po that each respective device should consume. The signal from the power supply system, in such embodiments, would cause either the sensor 1 and/or the mobile computing device 200 to alter its power consumption mode.

The power supply system is able to supply an amount of power or determine a split of Po depending on a state of charge of one or both of the sensor 1 and the mobile computing device 200. Accordingly, the power supply system identifies a power amount for P1 and P2 where P1 is greater than or less than P2 depend on the state of charge of one or both of the sensor 1 and the computing device. For example, if it is recognized that the mobile computing device 200 requires charging greater than the sensor 1, the power supply system may send a signal to the sensor 1 causing the sensor 1 to alter its power consumption mode to a lower power consumption mode thereby allowing power from the single power amount Po to bypass the sensor 1 and increase the amount of power P2 being supplied to the mobile computing device 200 in one or more scenarios including when the battery of the computing device 200 becomes too low. The battery of the computing device may be determined to become too low when comparing a level of charge of the battery to a low battery threshold, the level of charge of the battery either equals or is lower than the low battery threshold, a determination may be made by the sensor structure 1 or the power supply system that the battery charge of the computing device 200 is low.

Alternatively, it may not be necessary that the power supply system send a power consumption mode altering signal to either the sensor 1 and/or the mobile computing device 200. In such instances, once the sensor 1 senses that the mobile computing device 200 requires greater charging, the sensor 1 may automatically alter its power charging mode and/or power consumption mode on its own.

8. VR/AR Haptic Feedback

Existing head mounted devices may deliver virtual reality experiences in which the user of the head mounted device can visually see a virtual world and further, some of these head mounted devices may provide additional audio feedback to the user via the head mounted device. However, these existing head mounted devices lack additional sensory devices that provide enhanced feedback real world feedback which allow for an immersive mixed reality experience that is equally enhanced.

Accordingly, in a preferred embodiment of the present application, haptic feedback devices 28 are additionally provided to the head mounted display 100 together with additional auditory feedback devices. In such embodiments, the haptic feedback devices 28 and auditory feedback devices are provided separately and independent of the mobile computing device 200. For instance, haptic (e.g., tactile transducers, touch simulators, and other similar devices that apply forces, vibrations, or motions to user) and auditory feedback (e.g., sound producing machines, headphones, earphones, etc.) devices may be integrally provided at different segments of the head mounted display, other than segment including the mobile computing device 200, that effectively surround different portions of the end user's head. In this way, an end user in the real world can more comprehensively feel and hear mixed reality experiences in the real world. For instance, if in a mixed reality experience a virtual representation of a user falls and/or is struck by an object at a rear or a side portion of the user's head or the like, the haptic feedback devices 28 and auditory feedback devices would, preferably, be positioned near the estimated impact location and provide real world feedback so that the user can experience the mixed reality occurrence to an extent in the real world. Accordingly, the haptic feedback devices 28 are configured to provide real-world feedback to a user of the head mounted display 100 based on one or more occurrences in the mixed reality experience.

Additionally, and/or preferably, the haptic feedback devices 28 are low profile haptic exciters that are strategically positioned along portions of the main body 9 and/or along the straps and back pad body 18 of the head mounted display. The haptic exciters, in some embodiments, combine haptic feed components together with auditory feedback components so that haptic feedback and audio feedback may be provided at a same location. Alternatively, the haptic exciters may be provided separately from the auditory feedback components. Thus, the haptic exciters can be manufactured together with the primary components (e.g., main body 9, straps, and back pad) such that the haptic exciters are more fully integrated with the head mounted display. However, in additional and/or alternative embodiments, the haptic exciters may be modular and thus, augmented to the head mounted display 100 at a time later or after manufacturing thereby allowing a user to add as many haptic exciters, as necessary.

9. Automated Stereo Adjustment/IPD Correction

Additionally, in some embodiments of the present application, the head mounted display 100 is provided with image capturing devices, such as stereo cameras, at each eye box of the head mount that holds a lens. An eye box of the head mounted display 100 (e.g., the mask) generally refers to a designated area, such as a box, of the head mounted display providing a means of viewing or observing in a manner a display interface of the head mounted display 100. Specifically, the eye box defines a volume of space within which an effectively viewable image is formed by a lens system or visual display, representing a combination of exit pupil size and eye relief distance. Accordingly, in such a configuration an interpupillary distance of the eyes of the user, is preferably, known or determined by one or more eye position detections devices (e.g., cameras, sensors, etc.) to provide an alignment with each respective stereo camera. The interpupillary distance is, generally, the distance between the center of the pupils of the two eyes of the user. Thus, properly alignment and positioning of the stereo cameras is important so that the user can properly view images and the like being produced in the mixed reality experience. However, in some instances, the stereo cameras and the user's eyes are not sufficiently aligned to provide a sufficiently meaningful mixed reality experience and in such cases, one or more embodiments of the present application are configured to automatically adjust the interpupillary distance (IPD) of the stereo cameras to each be in alignment with a center of the corresponding user's eye.

In such embodiments, the head mounted display 100 provides a sensor 1 that can measure and/or detect an IPD of the user and compare such value with a current IPD configuration of the stereo cameras of the head mounted display. When it is determined by the sensor 1 and/or associated computer processor that there is a misalignment of the stereo cameras and the eyes of the user or that the measured IPD of the user and the determined distance between the center of the two stereo cameras do not match, then the head mounted display 100 is configured to automatically activate a motor (not shown) or the like that controls to adjust the positioning of the stereo cameras to be in alignment (e.g., axial alignment) with the users eyes. The motor, in such cases, is provided with the correct alignment and IPD information for the user and drives the stereo cameras so that each of the centers of the stereo cameras is aligned with respective centers of the user's eyes.

Accordingly, stereo cameras are preferably automatically (e.g., without human intervention) self-adjusting based on an identified IPD of the user thereby eliminating the risk of a user incorrectly adjusting the IPD relation with the pass through stereo cameras. It shall be noted, however, that while the IPD alignment of the stereo cameras may be performed automatically, either periodically or continuously, it may still be possible for a user to adjust the IPD alignment of the stereo cameras to suit their experience.

Additionally, and/or alternatively, once the IPD of the user is identified, the user can manually adjust the IPD alignment of the stereo cameras by physical moving each of the stereo cameras to be in axial alignment with each of the user's eye.

10. Dual Visible Cameras

In existing head mount devices, a single camera may be provided which is intended to capture the real-world environment of a user using the head mount device. The single camera, in such cases, is also used to capture and possibly track LEDs associated with a controller that is used in combination with the head mounted device. However, in some situations, it possible that the user may be position the wireless controller in such a manner that obscures the ability of the single camera to fully capture and map the user's real world environment. For instance, if the LED controller is brought too close to the user and/or the head mounted device, the LED controller may cast a shadow at which the single camera is not able to capture.

Figure 10:
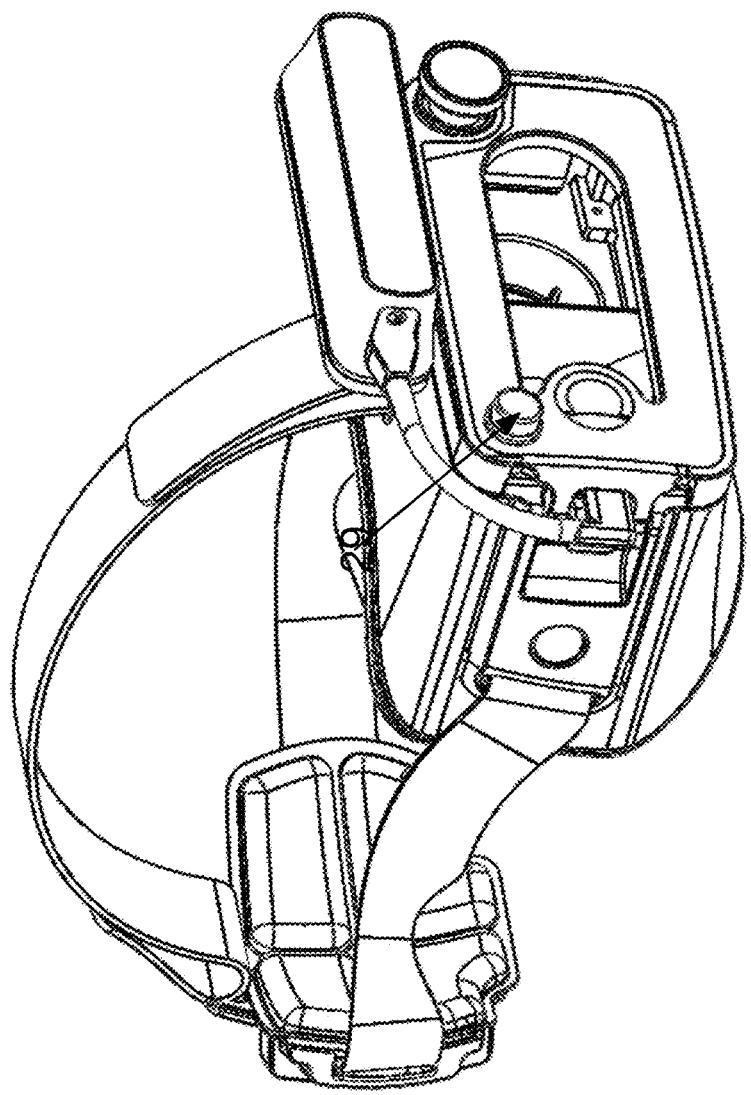
FIG. 10 illustrates a representative schematic of a head mounted display having multiple cameras of some embodiments of the present application.

Accordingly, in a preferred embodiment of the present application, a second visible camera 29 is provided to the head mounted display, as shown in FIG. 10. The second camera 29, in some embodiments, is provided onboard the sensor 1 and can capture the obscured regions including where shadows would typically be cast by operation of an LED controller or the like or those regions not visible to the camera 210 of mobile computing device 200. Such a configuration would optimize the spatial mapping performance capabilities of the head mounted display 100 because more regions and real data can be captured by both the camera 210 of the mobile computing device 200 and the additional camera at the sensor 1 thereby enhancing the mixed reality experience.

Additionally, and/or alternatively, the second visible and/or additional camera may be positioned outside of the sensor 1 and preferably at a position along the head mounted display 100 that allows the second camera 29 to capture overlapping and/or additional regions not captured by the single camera or cameras of the mobile computing device 200. Thus, the second camera 29 can be placed at a side or a rear of the head mounted display 100 whereas the camera(s) of the mobile computing device 200 is positioned to capture the user's forward facing environment. In this way, the additional images captured by the additional camera can be used to fill in gaps in the mixed reality view that are not visible from a single camera. Otherwise, these obstructed or unviewable parts of a mixed reality view would be hidden and might be rendered as "black" or software-hallucinated (guessed) segments.

11. Synthetic Stereo Rendering

Figure 13:
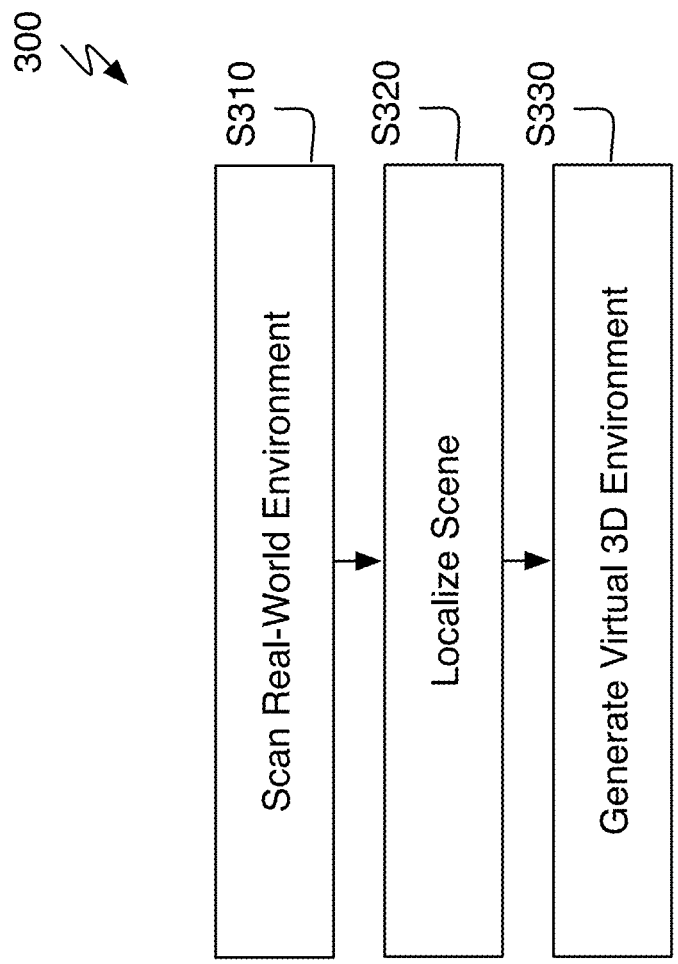
FIG. 13 illustrates a representative process flow for providing stereo cameras in a head mounted display of some embodiments of the present application.

As shown in FIG. 13, a process flow of a method 300 is provided for generating a synthetic stereo rendering using the head mounted display 100. For instance, the method 300 using the mono camera 210 of a mobile computing device 200 of a user and an additional camera of the head mounted display 100 is able to create a virtual scene of the user's environment in which the scene is localized using the mono camera, as a stereo camera. The steps of the process flow of method 300 includes Step 310 for scanning a user's real-world environment, step 30 for localizing the scene using the camera of the mobile computing device, step 330 virtually provide a three-dimensional (3D) model of the scanned scene. The system including the head mounted display 100 and mobile computing device 200 is able to scan, reconstruct, and project the 3D environment in real-time.

Accordingly, at step 310 the head mounted display 100 using the second camera scans a real-world environment of a user. In some embodiments, the user would be provided instructions from the head mounted display 100 to move around the room in such a manner that a 360 view of the entire room can be captured by the second camera. In such an embodiment, the head mounted display 100 can indicate to the user when a sufficient amount of scanning has been completed by providing an indication of completion, such as a verbal or visual indication or prompt. Additionally, and/or alternatively, the second camera of the head mounted display 100 may include a motor that functions to automatically move and/or rotate the second camera sufficiently to capture the environment of the user. It shall be noted that while it is preferred to use a single camera of the head mounted display to perform the scan, in alternative embodiments, it may be possible to use multiple cameras of a head mounted display which may also be augmented with images captured by the camera(s) of the mobile computing device.

At step 320, the method 300 then using the camera 210 of the mobile computing device 200, as a stereo camera, localizes the scene. Specifically, the method 300 is able to identify a special location of the camera 210 relative to the additional camera of the head mounted device and based on the relative spatial location of the camera 210, the head mounted display 100 processes the spatial information of the camera 210 to make the perspective of the camera 210 the center of the scene.

At step 330, the head mounted display 100 in connection with the mobile computing device 200 generates a 3D model or rendering of the user's environment based on the images obtained in the scan at step 310. The 3D model or rendering is preferably 360 degree view of the user's entire environment that may be displayed in single view by the user.

Still, at step 330, once the 3D model is generated, the system then drops the generated 3D model into the display of the user so that the user would feel as if they were in a true immersive 3D environment.

Additionally, using the wireless LED controller, the system provides a view or perception to the user that the wireless LED controller is at a distance from the user.

The methods of the preferred embodiment and variations thereof can be embodied and/or implemented at least in part as a machine configured to receive a computer-readable medium storing computer-readable instructions. The instructions are preferably executed by computer-executable components preferably integrated with the AR/VR image generation system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

The invention claimed is:

1. A head mounted display comprising:
   a main body;
   a door coupled to the main body via a hinge bracket, the door including at least one magnet to enhance alignment when closed;
   a depth sensor;
   a sensor mount for releasably coupling the main body to the depth sensor, the sensor mount positioned over the door and configured to move in conjunction with a movement of the door;
   a receptacle accessible via the door, the receptacle for receiving a computing device, the door configured to close and lock the computing device in a rigid position within the receptacle, the rigid position causing a fixed displacement between the sensor and a camera of the computing device;
   an L-shape hinge bracket to couple the second portion of the door, the L-shaped hinge bracket integrally connected to the sensor mount;
   a wide vision lens coupled to the door via the L-shaped hinge bracket, a center of the wide vision lens is aligned in the x, y, and z position with a center of the camera of the computing device and in the x position with the center of the depth sensor when the door is closed;
   a cable movably coupled to the door and the depth sensor, the cable to communicatively couple the depth sensor to the computing device, the door, and the depth sensor move together when the door is opened by the user with respect to the main body;
   a left side strap and a right side strap that are configured to secure the main body of the head mounted display to the head of the user;
   an adjustment mechanism positioned at a rearward section of the head mounted display opposite the main body, the adjustment mechanism to adjust a fit of the head mounted display to a head of a user, the adjustment mechanism including:
      a back pad foam having a first surface to contact the head of the user during use and a second surface opposite the first surface;
      a back pad insert having a first surface in contact with the second surface of the back pad foam and a second surface;
      a back pad body having a first surface in contract with the second surface of the back pad foam and a second surface, the back pad body coupled to at least one of the two or more semi-rigid securing straps;
      a ratchet gear having two hooks to coupled to the back pad body to the ratchet gear, the ratchet gear comprising a locking arm that operably engages the left side strap and the right side strap to tighten or loosen the head mounted display;
      a counter weight rigidly coupled to the back pad body and positioned at a rearward section of the head mounted display opposite the main body, the counter weight to counter balance a weight of at least a portion of the main body of the head mounted display and the computing device;
      an adjustment device coupled to the counter weight opposite the back pad body and operable by the user to control the ratchet gear; and
   an embedded power supply having a battery that is not tethered to an external or fixed power source, the embedded power supply positioned over the weighted component.

2. The head mounted display of claim 1, wherein the adjustment mechanism further includes an internal locking profile that is used in connection with the ratchet gear to adjust the fit of the head mounted display, and wherein the single locking arm of the ratchet gear comprises two hooks configured to latch against the internal locking profile of the adjustment mechanism.

3. The head mounted display of claim 1, wherein:
   the one or more securing elements comprises one or more semi-rigid securing straps that are configured to secure the main body of the head mounted display to a user's head,
   wherein the left side strap and the right side strap have a height and a width dimension, the height being greater than the width to limit a flex or deformation along the height to thereby transfer a distribute a weight of the head mounted display along a front to a back of the head mounted display.

4. The head mounted display of claim 3, wherein the left side strap and the right side strap have a radius of curvature that rises above other positions along the length of the respective securing strap.

5. The head mounted display of claim 1, wherein the counter weight together with a weight of the adjustment mechanism counter balance the weight of at least the main body of the head mounted display and the computing device.

6. The head mounted display of claim 1, wherein the door has a first part and a second part, wherein the second part comprises a second material different from a first material of the first part, the second material of the second part having a higher stiffness than the first material of the first part.

7. The head mounted display of claim 6, wherein the L-shape hinged bracket is aluminum.

8. The head mounted display of claim 6, wherein the sensor mount comprises the second material.

9. The head mounted display of claim 1, wherein the door is attachable and detachable from the main body of the head mounted display.

10. The head mounted display of claim 1, further comprises one or more embedded screens and one or more cameras, wherein the embedded screen interacts with the display interface of the computing device to display virtual and/or augmented reality environments.

11. The head mounted display of claim 1, further comprising:
   a top strap having a first end and a second end, the first end coupled to the main body and the second end coupled to the back pad insert.

12. The head mounted display of claim 1, wherein the embedded power supply is configured to split an initial amount of power (Po) to a first amount of power (PI) and a second amount of power P2, wherein P1 is greater than or less than P2 depending on a state of charge of one or both the sensor and the computing device.

13. The head mounted display of claim 12, wherein the sensor is configured to detect a power level of the computing device causing power to pass-through the sensor to the computing device when a battery of the computing device becomes low.

14. The head mounted display of claim 1, further comprising a plurality of haptic exciters positioned along the main body portion and along one or more securing straps of the head mounted display.

15. The head mounted display of claim 1, further comprising a plurality of haptic feed devices positioned along one or more sections of the head mounted display, wherein each of the plurality of haptic feedback devices is configured to provide real-world haptic feed to a user based on an occurrence of one or more events within a mixed reality environment.

16. The head mounted display of claim 1, further comprising a modular lens receptacle that is configured to receive a lens, wherein the modular lens receptacle is changeable to other modular lens receptacles with varying lens receiving profiles.

17. A head mounted display system comprising:
a head mounted display having:
a main body;
a sensor;
a door for accessing a receptacle that is configured to receive a computing device therein, wherein the door is operably connected to the main body via a L-shape hinge mount, wherein the computing device comprises a camera and a display interface and the L-shaped hinge bracket integrally connected to the sensor mount;
a sensor mount for releasably coupling the main body to the sensor, the sensor mount positioned over the door and configured to move in conjunction with a movement of the door;
a wide angle lens coupled to an exterior surface of the door by the L-shaped hinge bracket, a center of the wide angle lens configured to align in the x, y, and z position of a center of the camera of the computing device and in the x position with the center of the sensor when the computing device is within the receptacle;
an adjustment mechanism positioned at a rearward section of the head mounted display opposite the main body, the adjustment mechanism including:
a back pad foam having a first surface to contact a head of the user during use and a second surface opposite the first surface;
a back pad insert having a first surface in contact with the second surface of the back pad foam and a second surface;
a back pad body having a first surface in contract with the second surface of the back pad foam and a second surface, the back pad body coupled to at least one of the two or more semi-rigid securing straps;
a ratchet gear coupled to the back pad body, the ratchet gear comprising a single locking arm that operably engages a left side strap and a right side strap of the one or more semi-rigid securing straps via a tooth profile to tighten or loosen the first of the head mounted display to the head;
a counter weight rigidly coupled to the back pad body and positioned at a rearward section of the head mounted display opposite the main body, the counter weight to counter balance a weight of at least a portion of the main body of the head mounted display and the computing device;
an adjustment device coupled to the counter weight opposite the back pad body and operable by the user to control the ratchet gear.

18. The head mounted display of claim 1, further comprising a wireless light-emitting diode (LED) controller, wherein the wireless LED controller comprises a modular controller having a top portion comprising a plurality of LEDs that is removable from a bottom portion of the controller.

19. The head mounted display system of claim 18, wherein each of the plurality of LEDs at the face of the top portion comprises a different color.

20. The head mounted display of claim 17, further comprising an additional camera mounted on the head mounted display and that is separate from the camera of the computing device, wherein:
the sensor and a camera associated with the computing device scans a user's real world environment;
the additional camera aids in three-dimension scene reconstruction by capturing views that are not visible to the camera of the computing device during the scan,
a three-dimensional (3D) scene is generated based on the scan of the user's real world environment by the camera of the computing device and the additional camera, and
wherein the computing device localizes a view of the 3D scene based on a spatial location of the camera of the computing device.

21. A head mounted display comprising:
a main body;
a door coupled to the main body, the door including a first portion formed from polycarbonate and a second portion formed from metal, the door including at least one magnet to enhance alignment when closed;
a sensor mount for releasably coupling the main body to a depth sensor, the sensor mount positioned over and movably coupled to the door;
a receptacle accessible via the door, the receptacle for receiving a computing device, the door configured to close and lock the computing device in a rigid position within the receptacle, the rigid position causing a fixed displacement between the sensor and a camera of the computing device;
an L-shape hinge bracket to couple the second portion of the door, the L-shaped hinge bracket integrally connected to the sensor mount;
a wide vision lens coupled to a front surface of the door by the L-shaped hinge bracket and wherein a center of the camera of the computing device is aligned in the x, y, and z position with a center of the wide vision lens and a center of the depth sensor is aligned in the x position with the center of the wide vision lens when the computing device is in the rigid position within the receptacle are rigidly positioned for alignment with a wide vision lens;
a cable movably coupled to the door and the depth sensor such that the cable, the door, and the depth sensor move together when the door is opened by the user with respect to the main body, the cable to communicatively couple the depth sensor to the computing device;
a mask positioned between the main body and the head of a user, the mask including at least one modular lens;
a face foam positioned between the mask and the head of the user;

two or more semi-rigid securing straps that are configured to secure the main body of the head mounted display to the head of the user, the two or more semi-rigid securing straps having a height and a width dimension, the height being greater than the width to limit a flex or deformation along the height to thereby transfer a distribute a weight of the head mounted display along a front to a back of the head mounted display, each strap including a first portion and a second portion, the second portion having increased rigidity with respect to the first portion;

a plurality of haptic exciters positioned along the main body portion and along one or more securing straps;

an adjustment mechanism positioned at a rearward section of the head mounted display opposite the main body, the adjustment mechanism to adjust a fit of the head mounted display to a head of a user, the adjustment mechanism including:

a back pad foam having a first surface to contact the head of the user during use and a second surface opposite the first surface;

a back pad insert having a first surface in contact with the second surface of the back pad foam and a second surface;

a back pad body having a first surface in contract with the second surface of the back pad foam and a second surface, the back pad body coupled to at least one of the two or more semi-rigid securing straps;

a ratchet gear having two hooks to coupled to the back pad body to the ratchet gear, the ratchet gear comprising a single locking arm that operably engages a left side strap and a right side strap of the one or more semi-rigid securing straps via a tooth profile to tighten or loosen the first of the head mounted display to the head;

a counter weight rigidly coupled to the back pad body and positioned at a rearward section of the head mounted display opposite the main body, the counter weight to counter balance a weight of at least the main body of the head mounted display and the computing device;

an adjustment device coupled to the counter weight opposite the back pad body and operable by the user to control the ratchet gear; and an embedded power supply having a battery that is not tethered to an external or fixed power source, the embedded power supply positioned over the weighted component.

22. The head mounted display of claim 1, wherein the sensor mount is an L-shape hinge bracket coupled to the door, the L-shaped hinge bracket integrally connected to the sensor mount.

23. The head mounted display system of claim 18, wherein the top portion of the wireless LED controller includes a plurality of extending elements, wherein a face of the top portion includes a plurality of LEDs, wherein each of the extending elements extends at an angle from the face of the top portion and include at least one LED.

* * * * *